(12) United States Patent
Stump et al.

(10) Patent No.: US 10,354,304 B2
(45) Date of Patent: Jul. 16, 2019

(54) SYSTEMS AND METHODS FOR CREATING 3D OBJECTS

(71) Applicant: FATHOM, Inc., Oakland, CA (US)

(72) Inventors: Richard Stump, Alamo, CA (US); Tyler Ruskin Mihevc, Danville, CA (US)

(73) Assignee: Kemeera Inc., Oakland, CA (US)

( * ) Notice: Subject to any disclaimer, the term of this patent is extended or adjusted under 35 U.S.C. 154(b) by 0 days.

(21) Appl. No.: 14/217,134

(22) Filed: Mar. 17, 2014

(65) Prior Publication Data

US 2014/0279177 A1 Sep. 18, 2014

Related U.S. Application Data

(60) Provisional application No. 61/818,200, filed on May 1, 2013, provisional application No. 61/801,373, filed on Mar. 15, 2013.

(51) Int. Cl.
*G06Q 30/00* (2012.01)
*G06Q 30/06* (2012.01)
*B33Y 50/00* (2015.01)

(52) U.S. Cl.
CPC .......... *G06Q 30/0611* (2013.01); *B33Y 50/00* (2014.12)

(58) Field of Classification Search
CPC .......... G06Q 30/0601; G06Q 30/0283; G06Q 30/0611; G06F 17/50; B33Y 50/00
USPC ............................................. 705/80, 98, 37
See application file for complete search history.

(56) References Cited

U.S. PATENT DOCUMENTS

| | | | |
|---|---|---|---|
| 7,305,367 B1* | 12/2007 | Hollis | G06Q 30/0283 700/157 |
| 2004/0006405 A1* | 1/2004 | Chen | G05B 19/4099 700/119 |
| 2006/0041502 A1* | 2/2006 | Blair et al. | 705/37 |
| 2006/0052892 A1 | 3/2006 | Matsushima et al. | |
| 2008/0125892 A1* | 5/2008 | Hoguet | 700/98 |
| 2009/0271323 A1* | 10/2009 | Zinniel et al. | 705/80 |
| 2011/0052073 A1* | 3/2011 | Wallace | G06K 9/00704 382/190 |

(Continued)

OTHER PUBLICATIONS

Phillips, Robert. "Customized Pricing." Oct. 2010. Columbia Center for Pricing and Revenue Management. Retrieved May 30, 2015 from <http://www8.gsb.columbia.edu/cprm/sites/cprm/files/files/Working%20Papers/2010-1-customized-pricing.pdf>.*

(Continued)

*Primary Examiner* — Jason B Dunham
*Assistant Examiner* — Anand R Loharikar
(74) *Attorney, Agent, or Firm* — Kramer Levin Naftalis & Frankel LLP

(57) ABSTRACT

Systems and methods for providing price quotes for 3D objects are described herein. In one embodiment, costs related to generating a 3D object molded from a 3D printer mold may be based on various parameters. The process for generating a price quote may include uploading an initial file to a server and converting that file into a 3D CAD file. The method may also include selecting units, materials, a finish, and/or a quantity of objects to be made. Based on the selections, the server may generate a price quote to produce the one or more objects, and a checkout option may be provided allowing the user to purchase the one or more objects.

34 Claims, 23 Drawing Sheets
(7 of 23 Drawing Sheet(s) Filed in Color)

(56) References Cited

U.S. PATENT DOCUMENTS

2012/0232857 A1    9/2012  Fisker et al.
2013/0066812 A1*   3/2013  Nehme ............... B29C 67/0088
                                                         705/400

OTHER PUBLICATIONS

Thryft, A. R. (2011). Additive techniques come to low-volume manufacturing: New materials are speeding 3D prototyping and short production runs. Design News, 66(12), 36(4). Retrieved from https://dialog.proquest.com/professional/docview/1442406226?accountid=142257 (Year: 2011).*
International Search Report Application No. PCT/US2014/030929, dated Nov. 5, 2014.

* cited by examiner

FIG. 3

SYSTEMS AND METHODS FOR CREATING 3D OBJECTS

CROSS-REFERENCE TO RELATED PROVISIONAL APPLICATION

This application claims the benefit of U.S. Provisional Patent Application No. 61/818,200, entitled "SYSTEMS AND METHODS FOR PROVIDING PRICE QUOTES FOR 3-D OBJECTS," filed on May 1, 2013, and U.S. Provisional Patent Application No. 61/801,373, entitled "SYSTEMS AND METHODS FOR CREATING AND PRICING 3D PRINTED OBJECTS," filed on Mar. 15, 2013, both of which are incorporated herein by reference in their entirety.

FIELD OF THE INVENTION

Various embodiments generally relate to systems and methods for providing price quotes for 3D objects and 3D molds for producing 3D objects.

BACKGROUND OF THE DISCLOSURE 3D printing is a rapidly evolving technology field providing individuals with the ability to produce 3D objects quickly and cheaply relative to other methods. However, as 3D printing designs increase in complexity, the time and costs associated with producing 3D printed objects also increases. It would therefore be beneficial to provide systems and methods for printing 3D objects as well as 3D molding structures for rapidly creating 3D objects while accurately anticipating costs.

SUMMARY OF THE DISCLOSURE

Systems and methods for providing price quotes for printing 3D objects and 3D molding structures for creating 3D objects are provided. Such systems may include one or more users accessing a server across a network. The one or more users may want to produce a 3D object, and the 3D object may be molded from a 3D printer. Additionally, the one or more users may want a 3D printed mold to use to create 3D objects. The user or users may upload one or more files from a client device to the server where price quotes may be generated based on the initially uploaded file(s) and various parameters selected by the user. The user selected parameter may include dimensions, material or materials, finish, and/or quantity of objects, for example. In some embodiments, the complexity of the object may contribute to the cost of production. In some embodiments, the complexity of the mold may contribute to the cost of production. The server may calculate the price associated with producing a 3D object or a 3D printed mold automatically based on one or more of the aforementioned factors. In this way a user can quickly and easily determine the costs associated with production of 3D objects and/or 3D printed molds.

A method for providing price quotes for 3D objects molded from a 3D printed mold may include providing an initial file to be uploaded to a server. The initial file can be, or can be converted to, a 3D Computer Aided Design ("CAD") file, and parameters such as dimensional units, materials, finish, and quantity of products can be entered and/or selected. After selection of the parameters, a price quote may be generated for the product. In some embodiments, a checkout option may be provided so that a user may place an order for the product or products based on the received price quotes. In some embodiments, the price quote for a particular object may be stored on the server for later purchasing or for updating the server's cost model related to various parameters. In some embodiments, more than one file may be uploaded and price quotes for the files may be generated sequentially or in parallel. In further embodiments, the mold itself used to create the 3D object may be formed using a substantially similar process to that used for making the 3D object.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other features of the present invention, its nature and various advantages will be more apparent upon consideration of the following detailed description, taken in conjunction with the accompanying drawings in which:

FIG. 3 is an illustrative diagram of another client-side user interface in accordance with various embodiments;

DETAILED DESCRIPTION OF THE DISCLOSURE

The present invention may take form in various components and arrangements of components, and in various techniques, methods, or procedures and arrangements of steps. The referenced drawings are only for the purpose of illustrated embodiments, and are not to be construed as limiting the present invention. Various inventive features are described below that can each be used independently of one another or in combination with other features.

Figure 1:
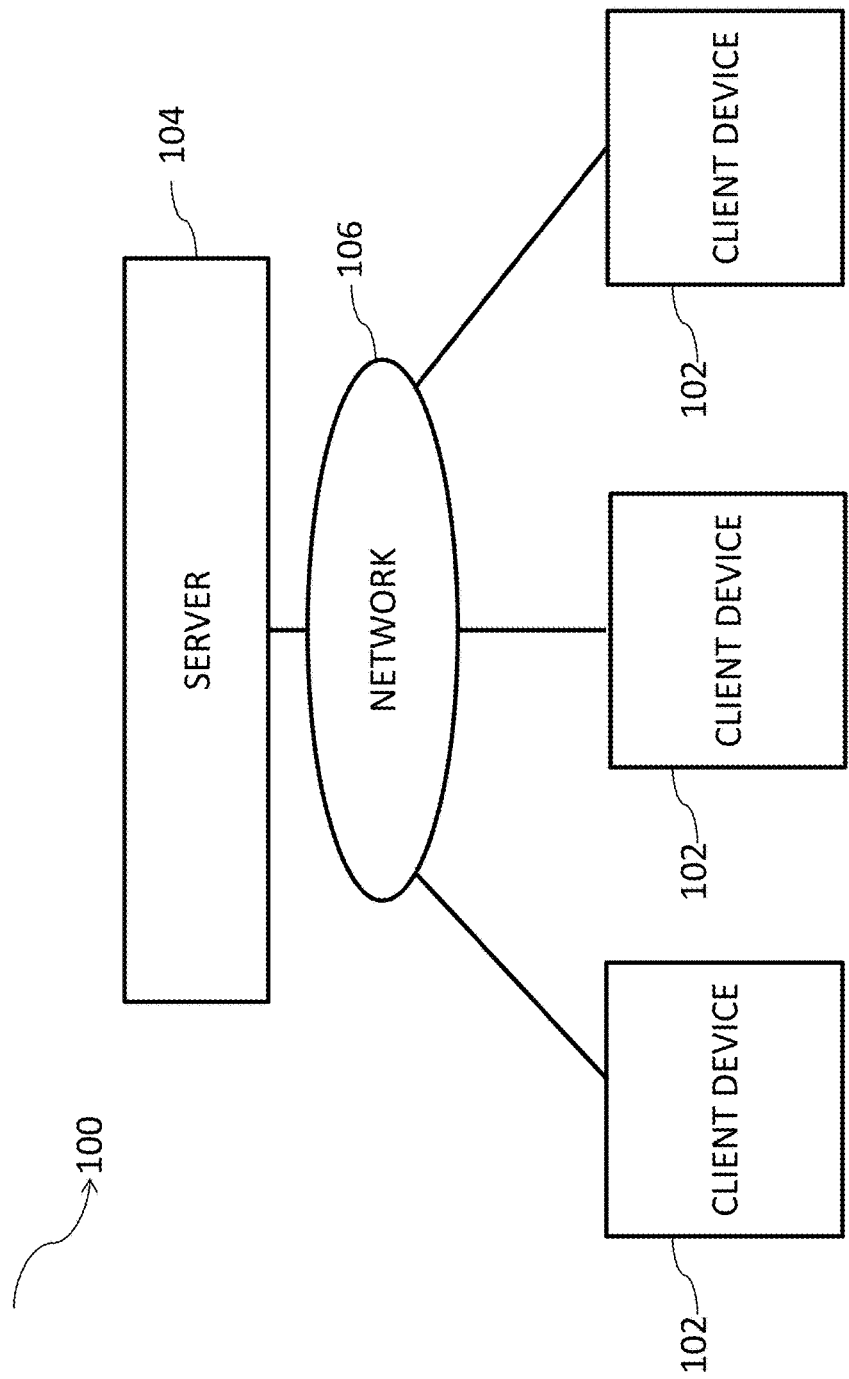
FIG. 1 is a block diagram of a system in accordance with various embodiments.

FIG. 1 is a block diagram depicting a system in accordance with various embodiments. System 100 may include client devices 102 and server 104 that may communicate over network 106. Client device 102 may, in some embodiments, communicate with both server 104 and/or one or more additional client devices 102. Persons of ordinary skill in the art will recognize that although only three client devices 102 are shown in FIG. 1, any number of client devices may be included, and the use of three client devices is merely exemplary.

Client devices 102 may correspond to any electronic device or system capable of communicating over network 106 with server 104 and/or one or more additional client devices. Various types of client devices may include, but are not limited to, portable media players, cellular telephones, pocket-sized personal computers, personal digital assistants ("PDAs"), desktop computers, laptop computers, and/or tablet computers. In some embodiments, client devices 102 may include control circuitry, storage, memory, communications circuitry, input and/or output interfaces as well as any of the additional features. Furthermore, one or more components of client devices 102 may be combined or omitted. For example, storage and memory may be combined into one component within client device 102.

Server 104 may correspond to any number of servers capable of facilitating communications and/or service requests from various client devices 102. For example, client devices 102 may send and/or receive data from server 104 across network 106. In some embodiments, server 104 may include one or more similar components as that of client device 102, and the previous description may apply.

Network 106 may correspond to any network, combination of networks, or network devices that may carry data communications. For example, network 106 may be any one or any combination of local area networks ("LAN"), wide area networks ("WAN"), telephone networks, wireless networks, point-to-point networks, star networks, token ring networks, hub networks, and/or any other network configuration. Network 106 may also support any number of protocols including, but not limited to, Wi-Fi (e.g., a 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDEN, LTE or any other suitable cellular network protocol), infrared, TCP/IP (e.g., any of the protocols used in each of the TCP/IP layers), HTTP, BitTorrent, FTP, RTP, RTSP, SSH, Voice over IP (VOIP), any other communication protocol, or any combination thereof. In some embodiments, network 106 may provide wired communications paths for client devices 102.

Although examples of embodiments may be described for a client-server model with a server servicing requests of a client application, persons of ordinary skill in the art will recognize that other models (e.g., peer-to-peer) may be available for implementation with the described embodiments. For example, a client application executed on a client device may handle requests independently and/or in conjunction with server 104.

Figure 2:
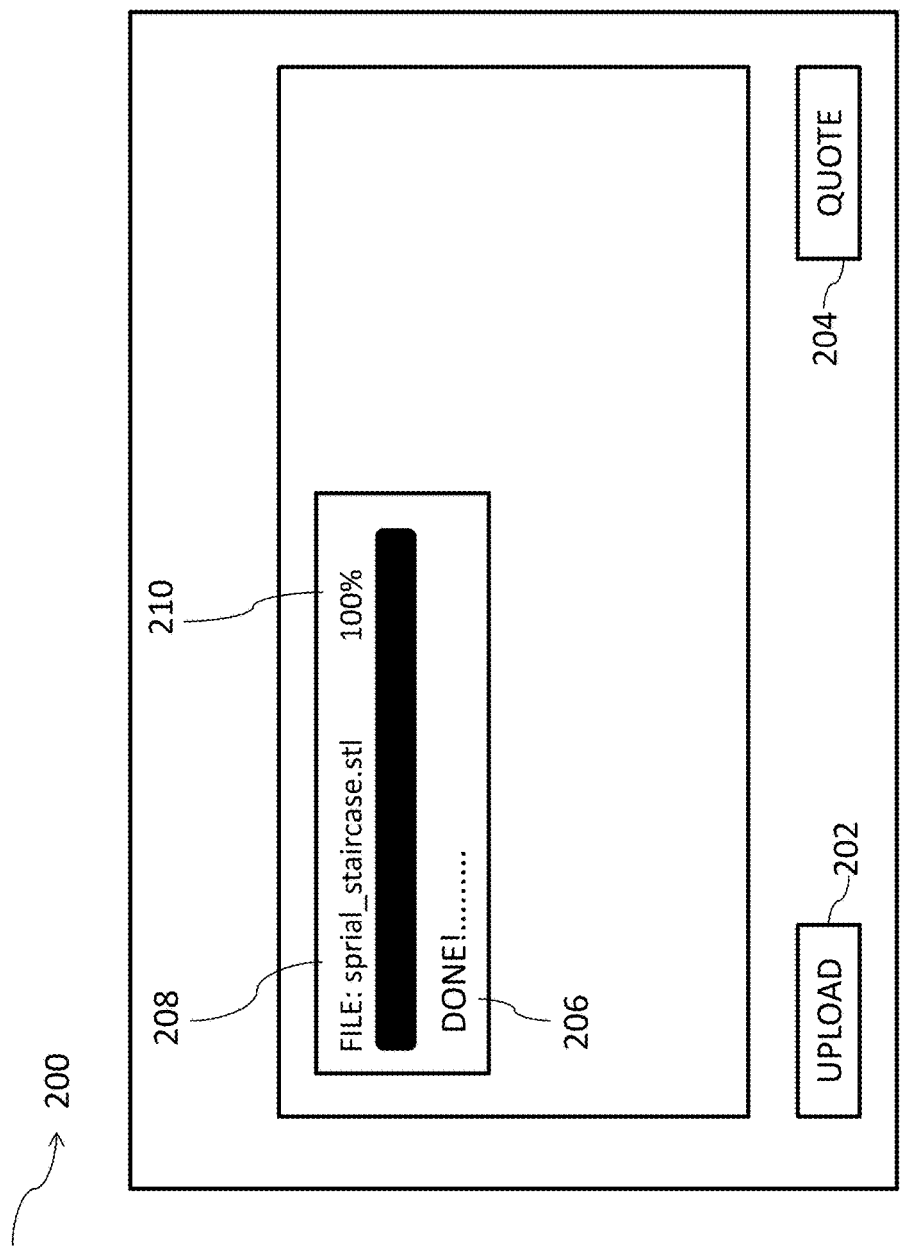
FIG. 2 is an illustrative diagram of a client-side user interface in accordance with various embodiments.

FIG. 2 is an illustrative diagram of user interface in accordance with various embodiments. A user, such as a user of client device 102 of FIG. 1, may upload one or more files to a server (e.g., server 104 of FIG. 1) via user interface 200 in order to receive a price quote for producing 3D objects or 3D molds. User interface 200 may, in some embodiments, include upload button 202, which may allow a user to upload files for receipt at the server. For example, a user may upload one or more visualization files that may provide data for rendering a visualization of a two-dimensional and/or three-dimensional object. Various types of files that may be uploaded to a server for visualization may include, but are not limited to, .asm files, STL files, IGES files, STEP files, Catia files, SolidWorks files, ProE files, 3D Studio files, and/or Rhino files. In some embodiments, the files to be uploaded may be digital images, such as a JPEG files, GIF files, PNG files, and/or PDF files. In some embodiments, the uploaded file may correspond to a scan of an image. For example, a user may take a digital scan of an object, and upload the scanned image (e.g., in a PDF file) to the server.

In some embodiments, digital images may include metadata indicating a geographical location associated with the image. In this particular scenario, the quoted price may include production of a 3D object or a 3D mold of the digital image as well as one or more 3D molds or objects corresponding to any landmarks associated with the specific geographical location of the digital image. For example, a user may take a picture of a friend or family member posing in front of the Golden Gate Bridge. The digital image may include metadata (e.g., geotagging) indicating that the picture was taken in a region of San Francisco, Calif. proximate to the Golden Gate Bridge. Software provided on the server may recognize that included with the uploaded digital image is a particular geographical landmark (e.g., the Golden Gate Bridge) in addition to a person. A price may be quoted for producing a 3D object including the friend or family member pictured within the image as well as a properly scaled 3D object of the Golden Gate Bridge. This functionality can provide a wonderful memento of a family trip or excursion to a particular location.

After a file has been selected for upload using user interface 200, status box 206 may be displayed therein to inform the user of the file's upload status. Status box 206 may, in some embodiments, include file name 208, which may correspond to the name of the file the price quote has been requested for. For example, a user may upload a file of a spiral staircase, such as "spiral_staircase.stl". In this particular scenario, file 208 may indicate that the uploaded file is an STL file based on the file name's extension.

In some embodiments, status box 206 may include completion indicator 210, which may indicate to the user the file's upload completion percentage. For example, before a file has been uploaded, completion indicator 210 may read 0%. Continuing this example, after the file has completely uploaded, completion indicator 210 may read 100%, which may indicate that the file has completely uploaded to the server.

In some embodiments, after a file has been uploaded to a server, such as server 102 of FIG. 1, the file may be stored within a user account created on the server. In some embodiments, however, the file may only remain on the server temporarily to ensure that no file may be copied or viewed by unauthorized persons. For example, after a file has been uploaded, and an object has been printed based on the file's design, the object may be deleted from the server. However, persons of ordinary skill in the art will recognize that any storage means may be used for the uploaded files, and the aforementioned are merely exemplary.

In some embodiments, user interface 200 may also include quote button 204. A user that has uploaded a file (e.g., spiral_staircase.stl) may press quote button 204 after completion indicator 210 reads 100%, which may indicate receipt and validation of the uploaded file for price quote generation at the server.

After the server successfully receives the file and the user has pressed quote button 204, the server may convert the uploaded file into a 3D CAD file, if necessary. In some embodiments, a determination may be made from the uploaded file as to how many triangles fill the region of an object described by the initial file, and a 3D file (e.g., 3D CAD file) may be generated based on the number of triangles determined to fill the volume of the object. An STL file, for example, may describe a raw unstructured triangulated surface by a unit normal and vertices (e.g., ordered by the right-hand rule) of the triangles using a three-dimensional Cartesian coordinate system. Triangulation generally is related to subdivisions of geometric objects into triangles. Persons of ordinary skill in the art will recognize that any coordinate system (e.g., polar coordinate system, spherical coordinate system, cylindrical coordinate system, curvilinear coordinate system, etc.) may be applied to the surface, and the use of the Cartesian coordinate system is merely exemplary. In some embodiments, a third-party application may be used to determine the number of triangles for an object. Persons of ordinary skill in the art will also recognize that any object or shape may be used to calculate the volume of the object within the uploaded file, and the use of triangles is merely exemplary.

In some embodiments, a user may select an option to build a 3D object or mold from "the ground up". In this scenario, instead of uploading an initial file, the user may create an object or mold within user interface 200. In some embodiments, the user may be provided with a blank CAD workspace on user interface 200, and may customize or create an object from scratch. In some embodiments, a user may open a blank CAD workspace from their own client device and build a 3D object or mold on their own personal client device. In this particular scenario, one or more extensions may be built-in to the user's client device and/or workspace, which may allow the user to send their created objects or molds directly to user interface 200 instead of having to upload a file to the server. For example, within a blank CAD workspace, a user may create a scale model car. The user, while still within the workspace, may select a button to export or get a quote for a cost of creating their design. In some embodiments, the extension may prompt a user to user interface 200 directly upon activation.

Figure 3:
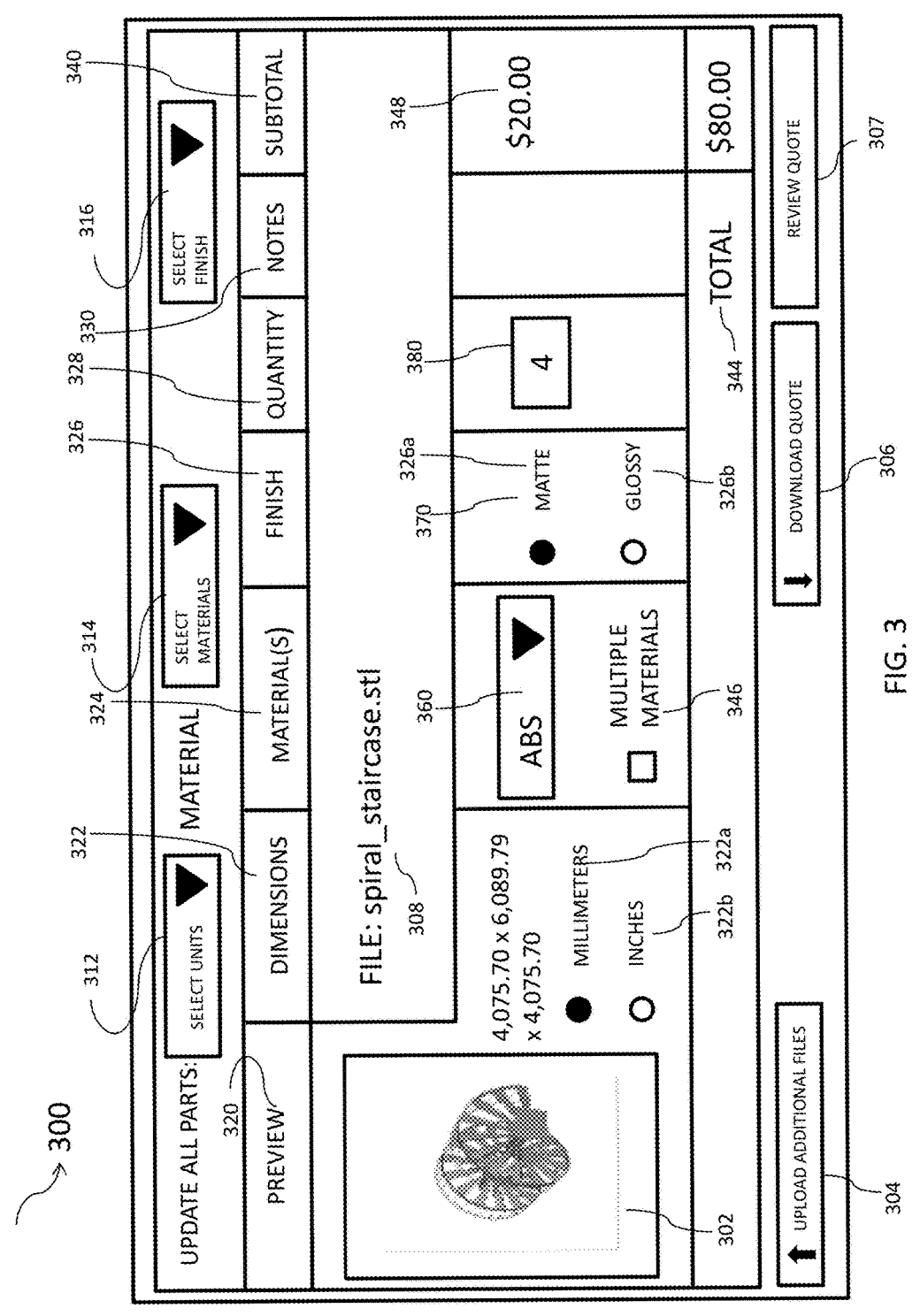

FIG. 3 shows an illustrative client-side user interface in accordance with various embodiments. User interface 300 may be presented to a user of a client device, such as client device 102, after a 3D CAD file has been uploaded to a server (e.g., server 104), or converted from a non-3D CAD file. In some embodiments, user interface 300 may include thumbnail image 302 located in a preview section 320. Thumbnail image 302 may correspond to 3D representation of an initially uploaded file. Thumbnail image 302 may provide a user with a preliminary idea of whether or not the file that the user has uploaded has been generated and/or converted to the 3D CAD file as expected. If thumbnail image 302 is incorrect, the user may choose to remove the initially uploaded file and begin the process again by pressing a "REMOVE" button to remove the file. Persons of ordinary skill in the art will recognize that a remove button as previously mentioned may be included at any location on user interface 300 and may be capable of providing the user with the option to remove the initially uploaded file.

In some embodiments, the initially uploaded file's name and/or various other pieces of information relating to the uploaded file may be displayed in file region 308. For example, the initially uploaded file may be "spiral_staircase.stl," which may be displayed within region 308 allowing the user viewing user interface 300 to easily view the initial file. The placement of file region 308 within user interface 300 is merely illustrative and, in some embodiments, file region 308 may not be displayed at all.

User interface 300 may also include dimensions section 322. Dimensions section 322 may present the size of the object from the initially uploaded file as well as the dimensional units that may be used to calculate a price quote for making the object. In some embodiments, dimensions section 322 may include options 322a and 322b. Option 322a may indicate that the dimensions are millimeters, whereas option 322b may indicate that the dimensions are inches. Persons of ordinary skill in the art will recognize that although dimensions section 322 shows only two options, any number of dimensional options may be used. For example, various dimensional units may include, but are not limited to, inches, feet, yards, centimeters, millimeters, or meters. In some embodiments, the user may change the units to be used. Each of options 322a and 322b may include a selectable button that may be pressed by the user. For example, as shown in FIG. 3, option 322a indicating millimeters has been shaded in, may signify that the user has chosen to proceed in millimeters. Selection of option 322a may cause user interface 300 to display the length, width, and height of the object from the initial file in units of millimeters. As another example, if the user selects option 322b indicating inches, the length, width, and height of the object may be shown in units of inches.

In some embodiments, an option may be included within user interface 300 that allows the user to scale up or scale down the object described by the uploaded file. For example, the uploaded image may, when converted into appropriate units, be smaller than the user initially desired. In this scenario, the user may select a slideable scale bar, or an increase size option, to increase the size of the 3D object. In some embodiments, the user may select to change a size of one or more sections of the 3D object to be formed. For example, if the user has uploaded a file describing a 3D spaceman, the user may increase the size of the spaceman's legs, while keeping the torso or arms a same size. Persons of ordinary skill in the art will recognize that any object, or any component of an object, may have its size manipulated.

User interface 300 may also include materials section 324. Materials section 324 may, in some embodiments, include drop down menu 360. Drop down menu 360 may include various materials available for the user to select to have the 3D object made of. Various types of materials may include, but are not limited to, acrylonitrile butadiene styrene ("ABS") like materials, photopolymers, plastics, DM Shore, DM Grey, Full Cure, Durus, MED610, nylons, machined aluminum, machined steel, brass, or epoxy. In some embodiments, the user may submit a request to have an additional material used. For example, the user may desire to have an object created out of a material including a precious metal. The user may submit the request to the server, and a price quote may then be based, among other factors, on the additional material requested. A user may also choose to use multiple materials by selecting multiple materials option 346. Selection of multiple materials option 346 may allow the user to create complex structures using multiple materials and/or molds.

In some embodiments, the user may be provided an option for modifying the density of the object or mold to be used. For example, certain materials may have a higher cost associated therewith. Thus, a denser object (e.g., a 3D ball), may be more costly to produce than others (e.g., a hollow 3D ball). Thus, the user may be able to modify the density to account for potential cost savings and/or structural improvements. As another example, some objects may require a large amount of material to be used due to the material's density. Thus, larger amounts of material may account for larger amounts of time for production. In this particular scenario, the user may be able to modify the density of the object to decrease the time needed for printing.

In some embodiments, the user may select a color for the 3D object within user interface 300. For example, the user may desire the 3D object to be blue, and therefore may select an option to create 3D objects that are blue. In some embodiments, the user may select multiple colors for the object and/or assign various colors to different portions or sections of the 3D object. For example, if the user uploads a file including a 3D image of a car, the user may select the body of the car to be a first color (e.g., red), while a second color may be selected for the wheels (e.g., black). In some embodiments, the use of a specific material may be associated with a specific color. For example, if the user selects a metallic material, the color of the created object may be of a metallic variety (e.g., silver, gold, bronze, etc.). In some embodiments, the user may upload a file having bitmap or voxel color assignments. For example, the user may upload a file describing a 2D object or image. The file may have a bitmap color assigned to each pixel within the file associated the 2D image, and thus a color scheme for the object to be printed may be used based on the bitmap assignments. As another example, the user may upload a file describing a 3D object having a voxel color assignment for each three-dimensional voxel within the file.

In some embodiments, materials section 324 may also include process drop down menu 365, which may correspond to various processes for creating the 3D object. For example, process drop down menu 365 may include an option to use a "PolyJet" process or an "FDM" process. PolyJet may be used for high precision 3D printing using high resolution ink-jet technology along with UV curable materials. FDM, or fused deposition modeling, corresponds to a process where layers of material are formed from a material by moving a base structure. FDM may, in some embodiments, be used for large objects having lower resolution. Persons of ordinary skill in the art will recognize that the aforementioned examples are merely illustrative, and any process may be used to form any 3D object.

In some embodiments, user interface 300 may include finish section 326. Finish section 326 may allow a user to choose a finish to be applied to the 3D object. Finish section 326 may include finish selection region 370 including finish options 326a and 326b. In one embodiment, finish option 326a may correspond to a matte finish, whereas finish option 326b may correspond to a glossy finish. Persons of ordinary skill in the art will recognize that although only two finish options are described, any number of finish options may be used.

In some embodiments, the user may also be able to select a texture for the 3D object to have. For example, the user may select one or more options that define an object having a smooth texture. In this scenario, the mold used to create the 3D object may include one or more inserts or be created using different materials to provide the 3D object with a smooth texture. Various textures may include, but are not limited to, smooth, coarse, rough, spikey, bumpy, or any other texture, or any combination thereof. In some embodiments, the user may select an option to have an additional material included on the created object to provide the required texture. For example, after a 3D object has been created, the object may be covered with a fabric or material having the required texture. Persons of ordinary skill in the art will recognize that any texture may be used, and any means to create the texture for the object may be performed, and the aforementioned is merely exemplary.

In some embodiments, user interface 300 may include quantity section 328. A user may input the number of 3D objects to be ordered into quantity section 328. For example, as shown in quantity section box 380, the user may select four (4) spiral staircases to be created. In other embodiments, quantity section 328 may include a default option that defaults the number of objects to be created to one (1) 3D object.

In some embodiments, user interface 300 may include notes section 330. Notes section 330 may allow a user to input any special instructions or pertinent information regarding the production of the 3D object. For example, a user may include a request to use a specialized material not found within material drop down menu 360 within notes section 330. In some embodiments, notes section 330 may be left blank, which may indicate that the user may not have any special comments, instruction, and/or notes.

In some embodiments, user interface 300 may include subtotal section 340, which may present a quote of the price to form one 3D object. For example, as shown in FIG. 3, a spiral staircase with millimeters option 322a selected, ABS material selected in materials section 324, and glossy finish option 326b selected, may correspond to subtotal value 348 of $20.00. In some embodiments, modifications to one or more options may increase or decrease subtotal value 348. For example, selection of inches option 322b may increase subtotal value 348. The value listed in quantity selection box 380 may be used in conjunction with subtotal value 348 to determine total cost 344. For example, if a user selects four (4) 3D objects having all of the previously mentioned selections, total cost 344 may correspond $80.00.

In some embodiments, user interface 300 may also include drop down menus capable of augmenting all the parts of the uploaded file or files. For example, drop down menus may be included such as units drop down menu 312, materials drop down menu 314, and finish drop down menu 316. In some embodiments, menus 312, 314, and 316 may have substantially similar functions to that described previously regarding dimensions section 322, materials section 324, and finish section 326, respectively. However, if a user selects multiple materials option 346, for example, drop down menus 312 and 316 may be used to change the characteristics of a composite material.

As an illustrative example, a user may select upload additional files button 304 and be presented with a user interface substantially similar to user interface 200 of FIG. 2. The user may then upload one or more additional files including 3D objects to be created. If this option is performed, an additional row related to the additionally uploaded file may be presented. Continuing with this example, drop down menus 312, 314, and 316 may be used to change the units, material, and/or finish of each of the objects included within user interface 300.

In some embodiments, user interface 300 may also include download quote button 306 and review quote button 307. Download quote button 306 may allow a user to download a copy of the quote as displayed on user interface 300. For example, if the user wants to email or print a copy of the quote, the user may select button 306 to retrieve a copy of the quote for their records and/or to be shared with others. Review quote 307 may be used if an individual would like to continue with the purchasing process and be provided with a comprehensive review of the options that have been selected.

In some embodiments, user interface 300 may include an option to directly print the 3D object. For example, instead of having to install a printer driver, user interface 300 may itself act as the printer driver. In this scenario, the user may directly print their 3D object or mold from within user interface 300. This may be extremely beneficial to a user proximate to the printer because they may be able to see the created object quickly, and make adjustments and refinements based on the created object. In some embodiments, selected parts of the 3D image may be directly printed independent of one another. For example, a user may select a first printer to create part of the 3D object while a second printer may be used to create another part of the object.

In some embodiments, user interface 300 may also include an indicator displaying an estimate time for the price quote to be generated and/or the object to be created. This option may allow the user to determine whether the time for the build is too long, and if any modifications may be performed to decrease the build time. In some embodiments, the price quote may have an associated build time. For example, an extremely complex design may have to be reviewed by one or more individuals to determine a price quote for the object, and therefore may take a longer time to generate.

In some embodiments, user interface 300 may be presented to a user on a third party website or application. For example, various brands or companies may harness the features of user interface 300 within their own website. A consumer may then purchase or obtain a price quote on the website, which may be related back to the server as a point of sale or creation site. For example, a shoe company may provide a user interface on their website that may be substantially similar to user interface 300. A user logging into the shoe company's website may decide to add a customized 3D logo to their shoe purchase. In this particular scenario, the user may be provided with an interface substantially similar to user interface 300, which may allow the user to design their logo. After the user has completed the design, the company website may transmit the design features to the server for a price quote to be generated. In some embodiments, the point of sale of the image may also occur on the company's website with the creation of the logo occurring externally. In some embodiments, integrated business management software may be linked to user interface 300. The software may, for example, allow the company to manage multiple facets of 3D printing and price quoting from one centralized platform. For example, file data created on the company's website may be transmitted to the server after the price quote has been generated along with payment information. In some embodiments, this may create a work order that may be linked to the company so that a user may still only communicate or interact with one primary website (e.g., the shoe company's website).

Figure 4:
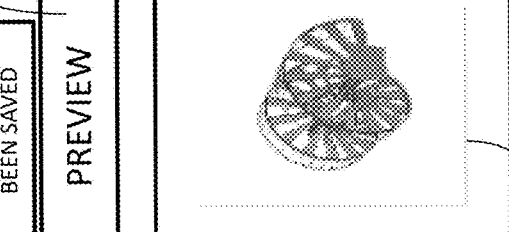
FIG. 4 is an illustrative diagram of still another client-side user interface in accordance with various embodiments.

FIG. 4 shows an illustrative client-side user interface in accordance various some embodiments. In some embodiments, user interface 400 may be presented to a user after pressing a review quote button (e.g., review quote button 307 of FIG. 3). User interface 400 may include thumbnail image 402, download quote button 406, preview section 420, dimensions section 422, materials section 424, finish section 426, quantity section 428, notes section 430, subtotal section 440, subtotal value 448, and total section 444, which may, in some embodiments, be substantially similar to preview image 302, download quote button 306, preview section 320, dimensions section 322, materials section 324, finish section 326, quantity section 328, notes section 330, subtotal section 340, subtotal value 348, and total section 344 of FIG. 3 with the exception that the various fields of user interface 400 may not be editable by the user.

In some embodiments, user interface 400 may include item number section 408 and part section 410. Item number section 408 may correspond to a part number defined by a manufacturer. Part section 410 may correspond to a file name initially used to generate the quote (e.g., spiral_staircase.stl). User interface 400 may also include material selection region 460, finish selection region 470, and quantity selection region 480. Regions 460, 470, and 480 may, in some embodiments, be substantially similar to sections 360, 370, and 380 of FIG. 3, and the previous description may apply. In some embodiments, regions 460, 470, and 480 may show finalized selections of the corresponding regions for a user to review.

In some embodiments, user interface 400 may include modify parts button 404 and proceed to checkout button 407. Modify parts button 404 may allow a user to modify one or more aspects of the order. For example, a user may realize, upon reviewing user interface 400, that the created object should have a matte finish instead of a glossy finish. By selecting modify parts button 404, a user may be prompted to a user interface substantially similar to user interface 300 of FIG. 3, thereby allowing the user make one or more appropriate changes. After a user is satisfied with their selections of parts and options based on user interface 400, the user may complete the order and/or remit payment by selecting proceed to checkout button 407.

In some embodiments, a user may be able to leave feedback regarding their experience within user interface 400. For example, the user may have a suggestion for an improvement of a specific tool or process within user interface 400. The user may be able to submit their suggestion for future functionality improvement. In some embodiments, the server may be able to track specific characteristics or selections by a user on user interface 400, and use these characteristics or selections to help the user's experience in future situations. For example, if a user requests a specialty material for their 3D object, the server may store that material in a database associated with the user. Thus, if the user returns to upload another file or to create another object, the previously requested material may be available.

In some embodiments, user interface 400 may include one or more delivery options for obtaining the 3D object or mold. For example, an additional region may be placed within user interface 400 that allows a user to select to have the object shipped overnight, priority, and/or ground. Each shipping option may also have an associated cost that may be factored into total cost 444. As another example, the user may also be allowed to select a "pick-up" option. This may allow the user to go to the location of the printing and pick up their purchase without having to pay (or wait) for shipping. Persons of ordinary skill in the art will recognize that any delivery option or time period may be used. For example, a user may select a particular date or range of dates to have their object delivered by. In some embodiments, the user may also be able to purchase or checkout with a purchase order. Upon approval from the server, the user may be able to complete the checkout for their object using their purchase order. However, persons of ordinary skill in the art will recognize that any payment method may be used including, but not limited to, credit card, internet payment, barter, check, and/or cash.

Figure 5:
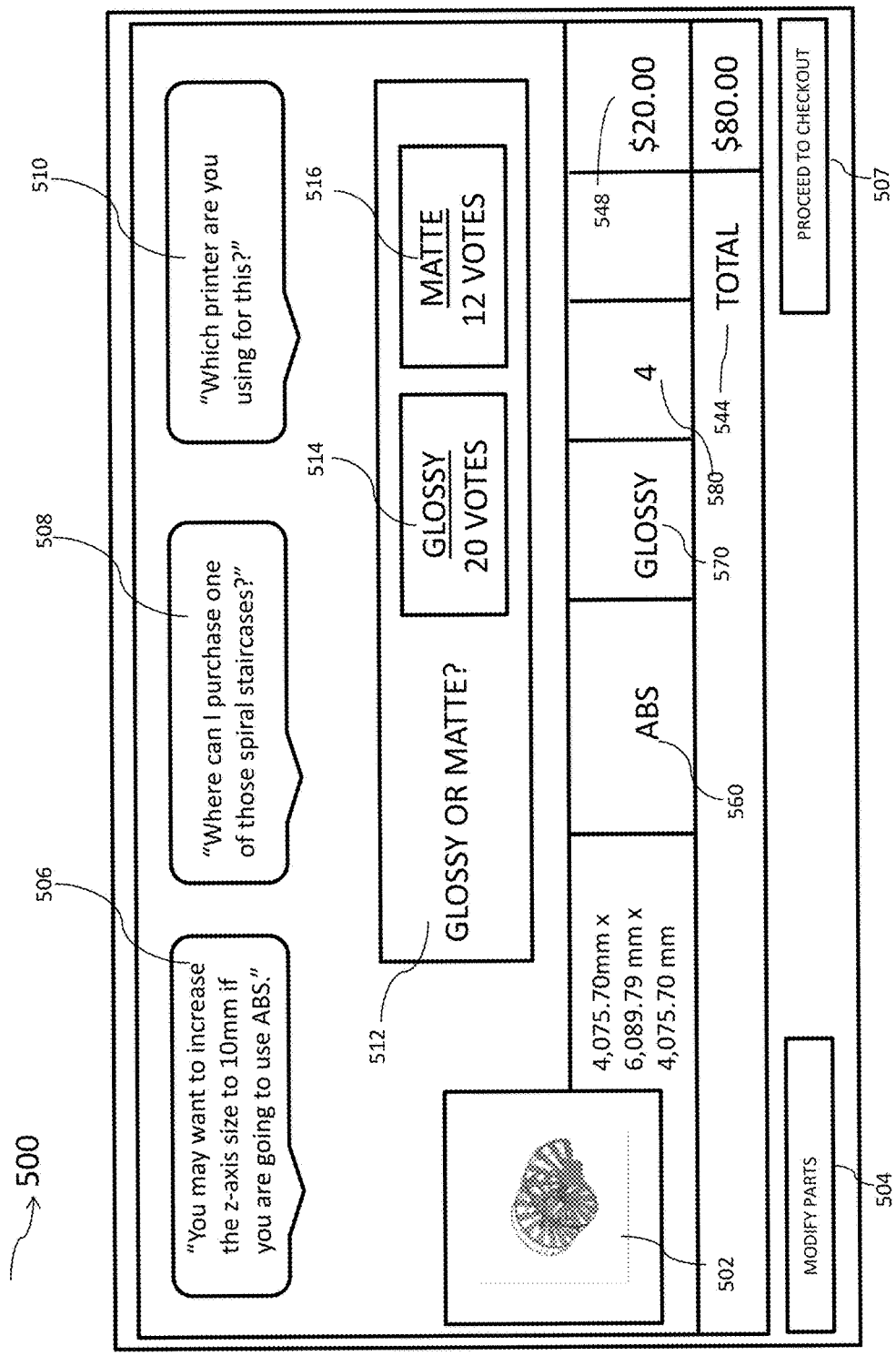
FIG. 5 is an illustrative diagram of still yet another client-side user interface in accordance with various embodiments.

FIG. 5 shows another illustrative client-side user interface in accordance various some embodiments. User interface 500 may include thumbnail image 502, modify parts button 504, proceed to checkout button 507, material selection region 560, finish selection region 570, quantity selection region 580, total section 544, and subtotal value 548, which may, in some embodiments, be substantially similar to thumbnail image 402, modify parts button 404, proceed to checkout button 407, material selection region 460, finish selection region 470, quantity selection region 480, total section 444, and subtotal value 448 of FIG. 4, and the previous description may apply.

In some embodiments, user interface 500 may be used as a cloud based project management solution interface. For example, a user may upload a file to user interface 500 (e.g., file 410), which may be broadcast to one or more additional users accessing the server. In this particular scenario, participants capable of accessing the sever may be able to share files, projects, and/or relevant project data with other users to obtain feedback, advice, suggestions, and/or comments. In some embodiments, comment 506 may be presented on user interface 500. User interface 500 may display comment 506 regarding a particular scenario where a user is allowing other users within a collaboration space to view their file, materials, and other relevant parameters to obtain feedback. For example, an additional user accessing a shared collaboration space may suggest to the user uploading the file, depicted by thumbnail image 502, that if the intended material is ABS, the dimensions along the z-axis may be more suitable if increased to 10 mm. This may be particularly useful for novice users as they may learn that certain structures, materials, and/or finishes, for example, may have optimal setting. Thus, the process of creating 3D object may become a more collaborative effort, harnessing the skills of a plurality of individuals.

User interface 500 may also include polling region 512. Polling region 512 may be used by a user, in some embodiments, to gain insight or seek opinions of collaborators for various parameters of their design. For example, a user may be unsure whether or not their 3D object should have a glossy finish or a matte finish. The user may poll the collaboration of users accessing the server to see what the collaborators think is a suitable choice. In some embodiments, polling region 512 may include vote counts 514 and 516. Continuing with the previous example, vote count 514 may indicate to a user the amount of collaborators who have voted for a glossy finish to be used, whereas vote count 516 may indicate an amount of collaborators who have voted for a matte finish. In some embodiments, the polling region may be created within, or linked to, one or more social media networks. For example, instead of polling the collaboration, the user may poll their friends or contacts within their social media network account.

In some embodiments, user interface 500 may also serve as an online marketplace where users may sell their designs or objects to others. For example, a user accessing the marketplace may view thumbnail image 502 and ask to purchase a version of versions of the 3D object, as shown by comment 508. The user may then submit purchasing information either directly to the design holder, or to the server as a third-party mediator. As another example, a user accessing the marketplace may view thumbnail image 502 and determine that they would like to purchase the design file used to create the image. In some embodiments, the marketplace may be used to help the user obtain potential investors for their product. For example, potential investors may view user interface 500 and determine if they would like to invest money in the user's design. In some embodiments, various users may trade or barter 3D objects or 3D designs instead of purchasing the objects or designs from a user. For example, a user may be able to ask another user whether or not they can trade them a 3D spiral staircase file for a 3D house file. This may allow users to work together to create elaborate 3D displays without the need to solely create the entire display by themselves.

In some embodiments, user interface 500 may also include printer selection comment 510. Printer selection comment 510 may help the user perform a variety of printing tasks. For example, comment 510 may allow the user to select one or more printers to print their 3D object. As another example, comment 510 may allow the user to see which printers are currently in use so that the user may select an open printer or wait for a desired printer to become available.

Each printer may be accessed by a user remotely across a network, such as network 106. In some embodiments, the printers may be owned by multiple entities, similar to a time share. In this particular scenario, multiple entities may have access to the printer at various times. For example, a printer may be owned by two companies, company A and company B. Company A may have access to the printer on every even numbered day, whereas company B may have access to the printer on every odd numbered day. In some embodiments, user interface 500 may include an option for managing the time share properties of the printer. For example, a notification may be displayed within user interface 500 indicating the current date, and whether company A or company B has access to the printer. In some embodiments, a calendar option may be provided within user interface 500 allowing individuals to reserve time with a printer and/or select the dates when they would be able to use the printer. For example, company A may seek to reserve the printer for the week of May 1-May 7. A calendar option displayed within user interface 500 may be displayed allowing company A to "block off" that particular week so that only company A may use the printer during that time period.

Figure 6:
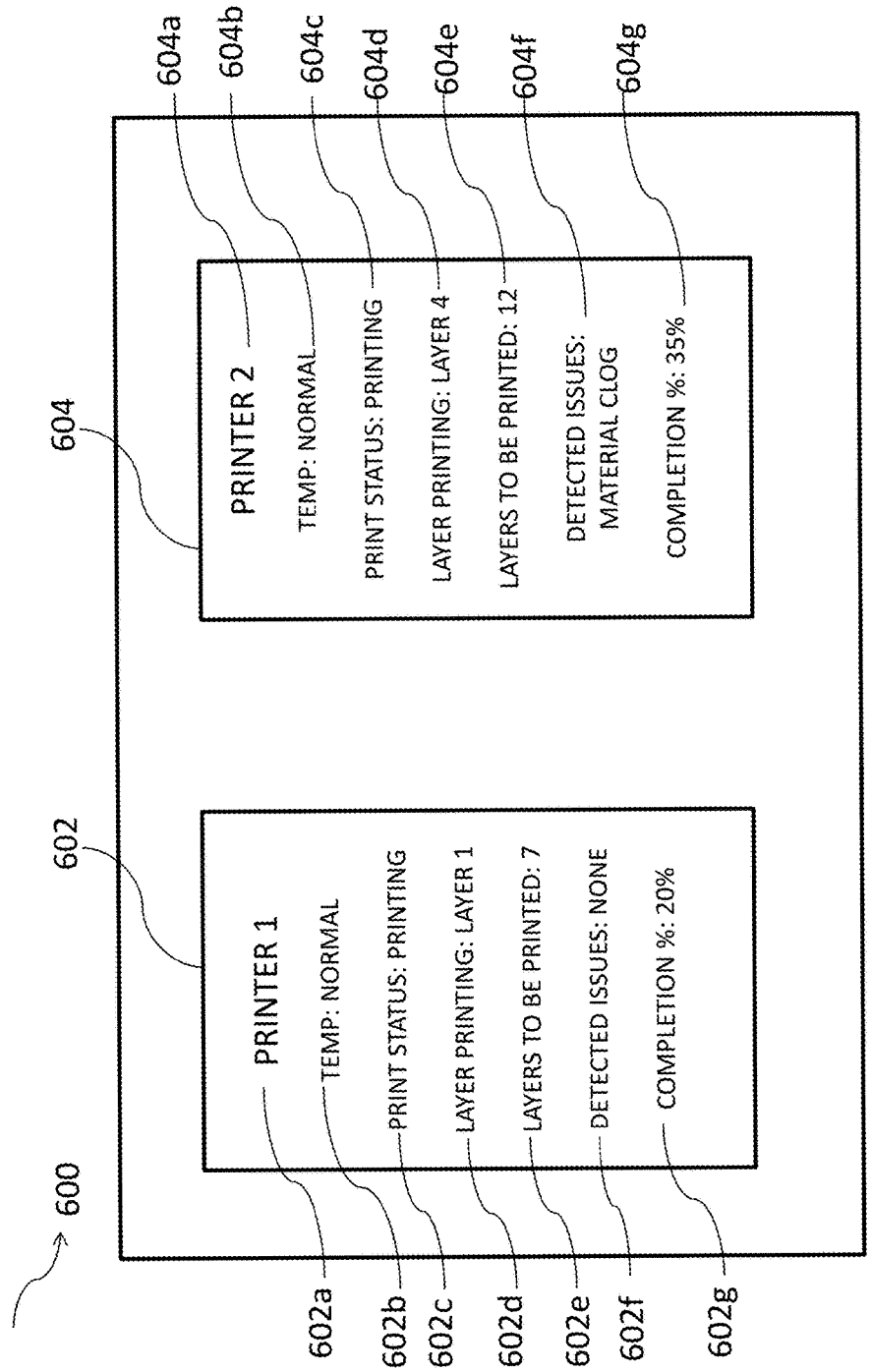
FIG. 6 is an illustrative diagram of further still another client-side user interface in accordance with various embodiments.

FIG. 6 is an illustrative diagram of further still another client-side user interface in accordance with various embodiments. User interface 600 may include first printer status report 602 and second printer status report 604. In some embodiments, users may review the status of each printer and/or the status of their current print job via status reports 602 and 604. Each status report may include the corresponding printer's name. For example, printer name 602a, "PRINTER 1", may correspond to status report 602, whereas printer name 602b, "PRINTER 2", may correspond to status report 604. Persons of ordinary skill in the art will recognize that although only two reports are displayed corresponding to two printers, any number of status reports corresponding to any number of printers may be displayed. It should also be understood that the term "printer" is used herein broadly to define a wide variety of printers including, but not limited to, inkjet printers, fused deposition modeling printers, granular material binding printers, photopolymerization printers, and/or mask image projection based stereolithography printers.

In some embodiments, printer status reports 602 and/or 604 may allow a user to monitor the various printers in use as well as data corresponding to a build of each 3D object. For example, status reports 602 and 604 may respectively include temperature readings 602b and 604b. Temperature readings 602b and 604b may allow a user to know the temperature of the printer, the temperature of the object or mold being formed, the temperature of the environment where the printer is located, or any other temperature reading, or any combination thereof. Status reports 602 and 604 may also include print statuses 602c and 604c, respectively. Print statuses 602c and 604c may allow a user to know a current status of the print job for a particular printer. For example, a printer may currently be printing, queued to print, asleep, jammed, or the printer may have an error causing a warning or alarm to be displayed.

In some embodiments, status reports 602 and 604 may include layer inspection information allowing the user to know the status of each layer of the printing as it occurs. For example, printer layer indicators 602d and 604d may indicate to the user which layer of the print job is currently being printed. Total layer indicators 602e and 604e may also be included within reports 602 and 604, respectively, which may inform the user of a total number of layers included within the current print job.

In some embodiments, as each layer is printed a detailed analysis of the layer may be performed by software resident on the server and/or printer, and if any issue is detected it may be displayed by indicators 602f and 604f, respectively. The analysis may look for potential issues that may have occurred during the latest layer's printing. For example, the analysis may look to make sure all the material has successfully been placed, the material has hardened to a suitably level, and/or perform any other analysis tool, or any combination thereof. In some embodiments, a video display of each print job may be presented within status reports 602 and 604 allowing the user to inspect the print job as each layer is printed. This may allow the user to detect any issues while stationed remotely from the printer. As an illustrative example, report 604 may display indicator 604f, indicating to the user that there may be a clog detected within the printing of layer 4 on printer 2. In some embodiments, reports 602 and may also include completion percentage indicators 602g and 604g, respectively.

Figure 7:
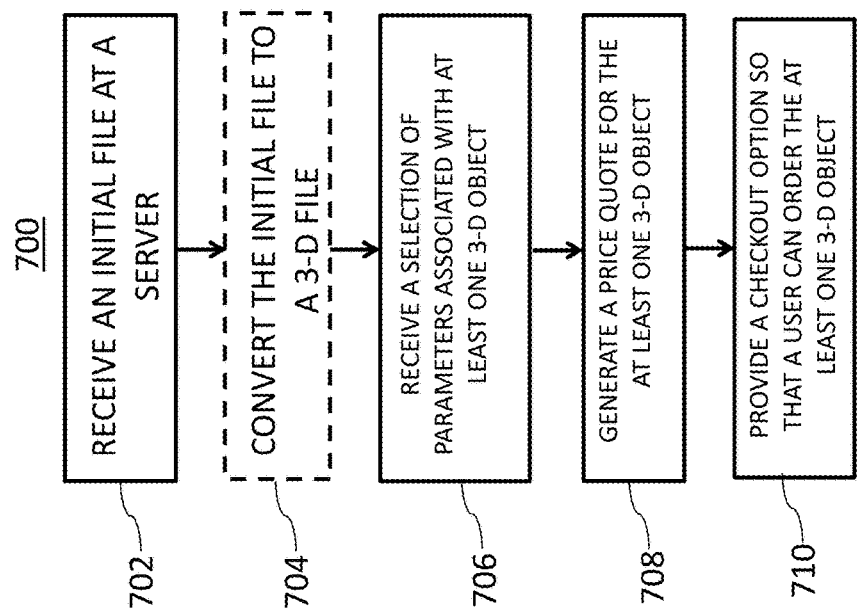
FIG. 7 is a flow chart of an illustrative process for generating a price quote in accordance with various embodiments.

FIG. 7 is a flowchart of an illustrative process for providing a price quote for a 3D object in accordance with various embodiments. Process 700 may begin at step 702. At step 702, an initial file describing a 3D object to be formed may be received at a server (e.g., server 104 of FIG. 1). In some embodiments, a user may upload a file describing an object to the server using a client device (e.g., client device 102 of FIG. 1). A user may upload one or more file types, including, but not limited to, STL files, IGES files, STEP files, Catia files, Solid Works files, ProE files, 3D Studio files, and/or Rhino files. In some embodiments, a user may upload JPEG or GIF files, which may include geographical metadata. Persons of ordinary skill in the art will recognize that any file type may be used, and the previously listed file types are merely exemplary. In some embodiments, a user may upload one or more files that describe the 3D printed molds used to form 3D objects and/or the 3D object from which 3D printed molds are to be created.

At optional step 704, the initial file may be converted to a 3D CAD file, if necessary, after the initial file has been received at the server. In some embodiments, converting the initial file to a 3D CAD file may include determining a number of triangles capable of fitting into the object's volume. In some embodiments, converting the initial file to a 3D CAD file may include determining a density of the object depicted by the 3D file. In some embodiments, the user may upload a 3D CAD file at step 702, and step 704 may be skipped altogether. In some embodiments, the initial file may be converted into another 3D file type instead of a 3D CAD file. In some embodiments, the conversion of the initial file to a 3D CAD file or other 3D file may be performed using one or more algorithms resident on the server.

At step 706, a selection of parameters associated with the 3D object to be formed may be received. For example, a user may select the units to be used to define dimensions of the object, the material or materials that the object may be formed from, the finish of the object, and/or the quantity of objects to be created. In some embodiments, a user may upload more than one initial file. In this particular scenario, the user may select the units, materials, finish, and quantity corresponding to the one or more of the 3D objects to be made from the one or more uploaded files.

At step 708, a price quote for the at least one 3D object may be generated. In some embodiments, the price quote may be based on the parameters selected at step 706 and/or any other suitable factors. For example, software provided on the server may be used to calculate an approximate density, size, and/or complexity of the object to be made and, based on the calculations, generate a price quote. In some embodiments, certain materials may have a greater price per density than others. In some embodiments, the finish selected may affect the generated price quote. In some embodiments, the quantity of molds to be made, or needed to form the object, may affect the generated price quote. In some further embodiments, the complexity of the object to be formed may affect the generated price. For example, a complex object having small or extremely detailed portions may require multiple molds in order to be created. This may have a higher cost to produce than a simple object due, at least in part, to the amount of molds and/or materials needed for production.

At step 710, a checkout option may be provided to the user to purchase the object or objects (e.g., using user interface 400 of FIG. 4). For example, a user may be capable of providing payment and/or billing information, shipping information, or any other additional information. In some embodiments, the checkout option may allow the user to review the generated price quote and determine whether or not to proceed with the purchase order. In some embodiments, the ordering of the steps may be rearranged (e.g., step 706 could be before step 702 and step 704).

In some embodiments, after a user purchases the mold or object, data associated with the mold or object may be stored in a database on the server. The database may be used to help continually improve and refine process 700 to generate quotes. In some embodiments, data collected from initially received files, complexity of molds created, costs associated with complexity, and/or other data generated to create a quote may be used to train a classifier. The classifier may learn from the data and be trained to indicate where complexities exist with the three-dimensional object that may affect the cost and/or the associated costs for the complexities. Any machine learning algorithm may be used to classify costs related to creation of three-dimensional objects and corresponding molds, including, but not limited to, nearest neighbors, random forest, decision tree, association rule learning, artificial neural networks, genetic programming, inductive logic, support vector machines, clustering, Bayesian networks, reinforcement learning, representation learning, similarity learning, dictionary learning, and/or any other machine learning algorithm, or any combination thereof. In some embodiments, the design of the initially uploaded object may be reviewable by the server and/or additional users to determine potential complexities within the design of the object from the initial file. For example, the initial file uploaded to the server, which may be reviewed by members of a forum of experts to determine potential improvements for the design of the object. In some embodiments, the database may be used to store information pertaining to the user and the objects selected for checkout for future reference.

In some embodiments, after parameters are selected and a price quote has been generated, a prompt may be displayed on the user interface to select one or more additional files to upload to the server. If the user does have any additional files to upload, the user may be prompted back to step 704. If not, the user may continue to checkout at step 710.

In some embodiments, after a user selects the parameters and a price quote is generated, the user may determine to remove the initial file and begin the process again by selecting a remove file button. If the user selects the remove file option, the user may be prompted back to step 702. If not, and the user is satisfied with the generated price quote, the user may be prompted to the checkout option at step 710.

Figure 8:
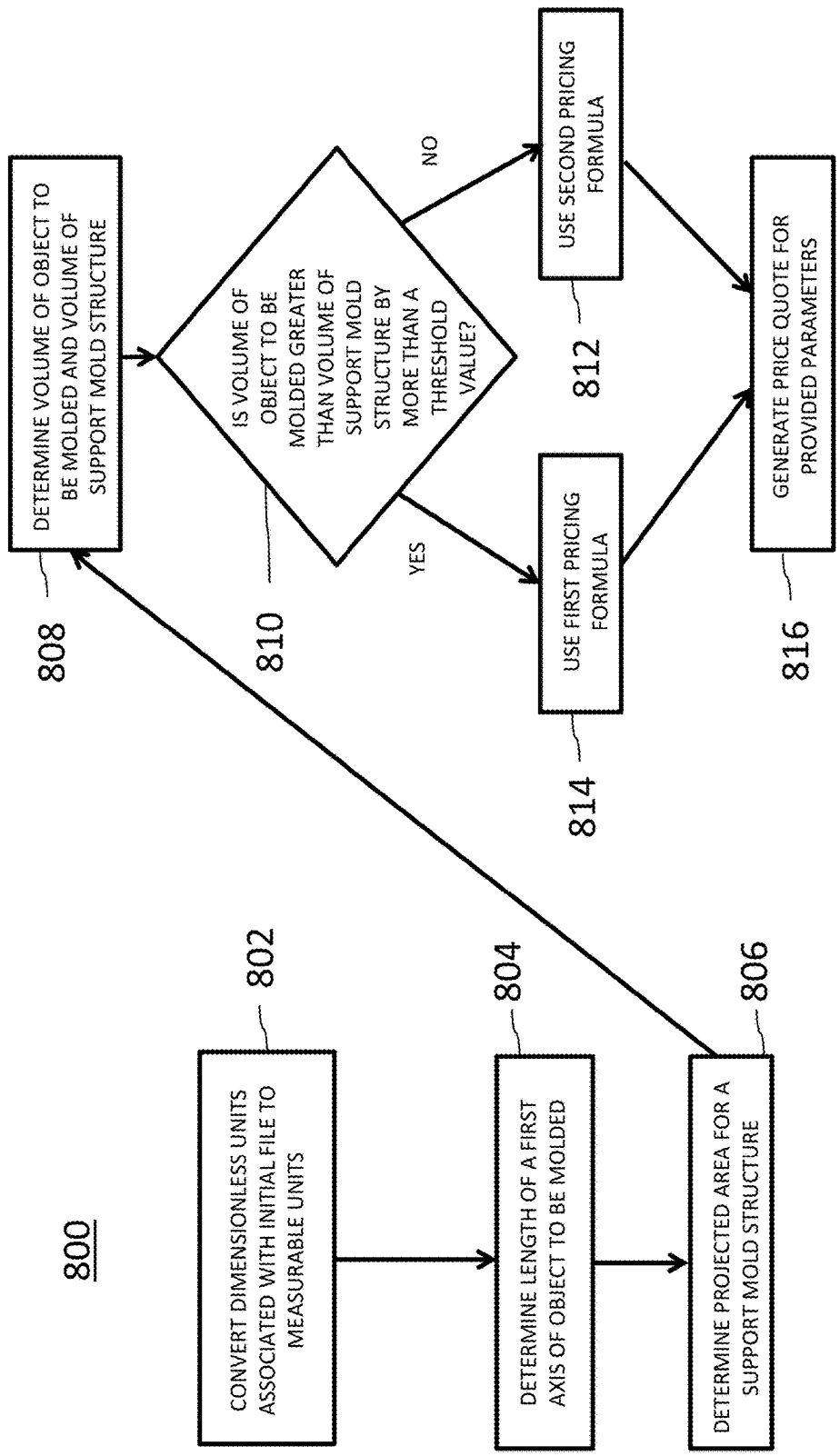
FIG. 8 is another flow chart of an illustrative process for generating a price quote in accordance with various embodiments.

FIG. 8 is a flowchart of an illustrative process for generating a price quote in accordance with various embodiments. Process 800 may begin at step 802. At step 802, dimensionless units associated with an initially uploaded file may be converted to measurable units. For example, a user may upload an STL file (e.g., spiral_staircase.stl) to a server, such as server 104 of FIG. 1. The object described by the STL file may, in some embodiments, have dimensionless units. In this scenario, the dimensionless units may be converted into measurable units (e.g., inches, millimeters, etc.) in order to produce a physical object.

At step 804, a length of a first axis of an object to be molded may be determined. For example, an uploaded file that has been converted to a 3D file may have a first axis' length (e.g., a z-axis) determined. In some embodiments, the server may determine a length of a second or third axis (e.g., an x or y-axes) instead of the first axis.

At step 806, the server may determine a projected area for a support mold structure. A support mold structure may correspond to any structure that may be used to provide support for the mold. For example, when forming a mold of an object, the size of the mold may be larger than the object. In some embodiments, the support structure may be the outer surface area used for the mold.

At step 808, a volume of the object to be molded and a volume of the support mold structure may be determined. In some embodiments, the determined length of the first axis may be used to determine the volume of the object or support mold structure. For example, if the object is a ball, the first axis may be used to determine the volume of the ball, and a corresponding support structure may be determined.

At step 810, a determination may be made as to whether the volume of the support mold structure is greater than the volume of the object to be molded by a threshold value. For example, if the volume of the support mold structure is ten (10) times greater than the volume of the object to be molded, a certain pricing scheme may be used. If not, an alternative pricing scheme may be used. The threshold may be any value determine by the server and/or by the user. The threshold value may also be manipulated based on any number of factors including the materials to be used and/or the quantity of objects to be created, for example. Persons of ordinary skill in the art will recognize that any threshold value may be used, and the use of ten (10) is merely exemplary. For example, the threshold value may range from two (2) to fifty (50) times greater than the volume of the object to molded.

If, at step 810, the volume of the support mold structure is determined to be greater than the volume of the mold by the threshold value, or more than the threshold value, then process 800 may proceed to step 814 where a first pricing formula may be used. If, however, at step 810, the volume of the support mold structure is determined to be less than the volume of the object to be molded by the threshold value, then process 800 may proceed to step 812 where a second pricing formula may be used. In some embodiments, the first and second pricing formulas may be substantially similar or substantially different. Persons of ordinary skill in the art will recognize that any pricing formula may be used. For example, if the object uses a certain material (e.g., ABS), then a certain formula may be used indicating a particular pricing scheme. In some embodiments, the use of millimeters or inches may cause one or more different pricing schemes to be used. After either the first pricing formula or second pricing formula is used at steps 814 and 812, respectively, process 800 may proceed to step 816 where a price quote may be generated.

Figure 9:
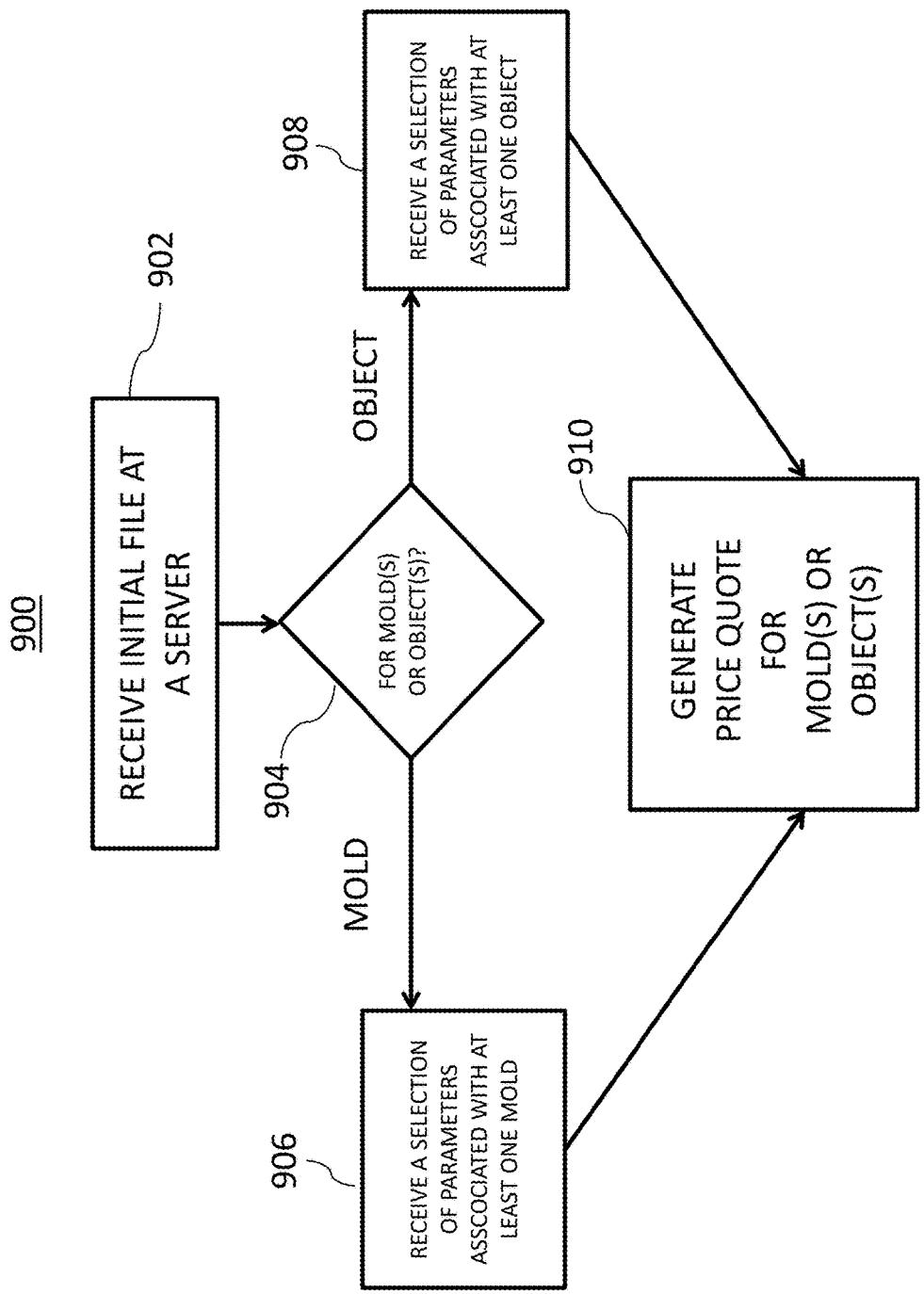
FIG. 9 is still another flow chart of an illustrative process for generating a price quote in accordance with various embodiments.

FIG. 9 is a flowchart of an illustrative process for providing a price quote for a 3D object or a 3D mold in accordance with various embodiments. In some embodiments, a user may provide an initial file or files to a server and procure a price quote for generating either a 3D object or a 3D mold described by the initial file or files.

Process 900 may begin at step 902. At step 902, an initial file describing a 3D object or a 3D printed mold may be received at a server (e.g., server 104 of FIG. 1). In some embodiments, a user may upload a file to the server using a client device (e.g., client device 102 of FIG. 1). A user may upload one or more file types including, but not limited to, STL files, IGES files, STEP files, Catia files, SolidWorks files, ProE files, 3D Studio files, and/or Rhino files, for example. In some embodiments, a user may upload JPEG or GIF files, which may also include geographical metadata. Persons of ordinary skill in the art will recognize that any file type may be used, and the aforementioned are merely exemplary.

At step 904, after the initial file has been uploaded, a prompt may be displayed within a user interface requesting a definition of what the user would like to procure. For example, the prompt may ask whether the initial file corresponds to a 3D printed mold or for a 3D object.

If, at step 904, a 3D printed mold is desired, then process 900 may proceed to step 906. At step 906, a selection of one or more parameters associated with the 3D mold to be formed may be received. For example, a user may select units used to define dimensions of the object or objects to be formed by the mold, the material or materials the mold is to be formed from, the finish of the object formed by the mold, and/or the quantity of molds to be created.

In some embodiments, the server and/or the user may determine the complexity of the 3D printed mold and base the quoted price on the complexity. A multitude of factors may contribute to the complexity of the 3D printed mold and thus the price quoted. For example, use of more than one mold may correspond to an increase in price quoted because additional molds may need to be printed. In this scenario, the dimensions, materials, and finish of the object to be formed by the 3D printed mold may be determined at step 906.

Another factor that may contribute to the complexity of the 3D printed mold may be the intricacy of the actual mold and/or the design of the object formed by the mold. For example, a 3D printed object having a very thin hollow region (e.g., a ring) may be more complex than a sphere. Additionally, if the object to be formed by the mold has fine details, additional molds may be required to form the base structure and then the finer details.

Still another factor that may contribute to the complexity of 3D printed molds may be the materials used to form the mold and/or the object. Different objects to be formed may require molds created using different materials. For example, the 3D object may require the 3D printed mold to have additional materials used for support structures. A structure that may have a very thin region (e.g., a ring) may require an additional material with high strength to ensure that deformation of the thin region does not occur. As another example, the thermal properties of specific materials may affect the complexity of the mold.

Returning to step 904, if a 3D object is to be purchased, then process 900 may proceed to step 908. At step 908, a selection of parameters associated with the 3D object to be formed may be received. In some embodiments, step 908 of process 900 may be substantially similar to step 706 of process 700, and the previous description of the latter may apply to the former.

After a selection of parameters associated with the one or more objects or the one or more molds has been received, process 900 may then proceed to step 910. At step 910, the server may generate a price quote for the one or more 3D objects or the one or more 3D molds. In some embodiments, the price quote may be based on the parameters selected at step 906, step 908, and/or any other suitable factors. In some embodiments, step 908 may be substantially similar to step 708 of process 700 with the exception that the price quote may be for the one or more objects or the one or more molds.

Figure 10:
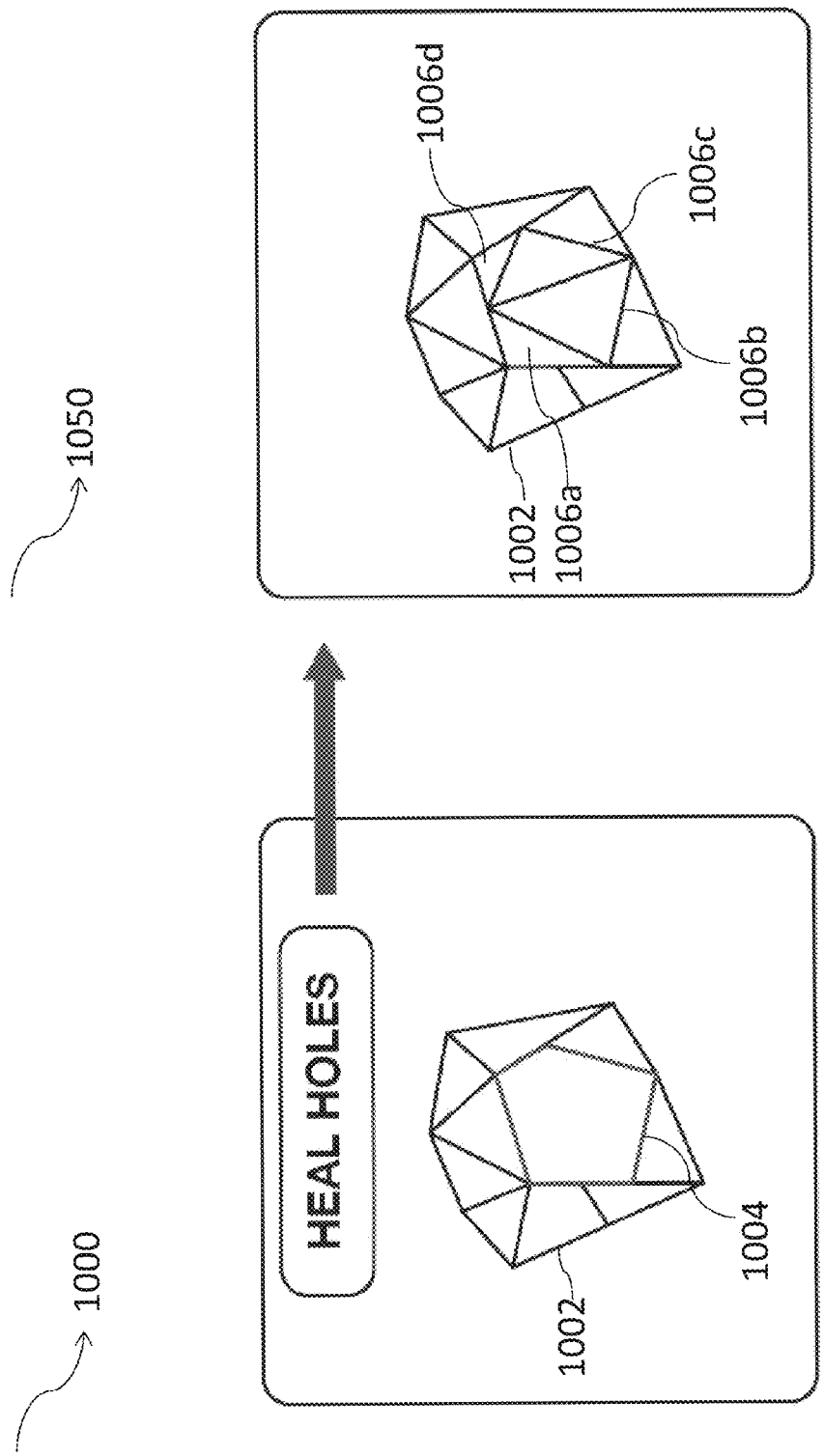
FIGS. 10A and 10B are illustrative diagrams of client-side user interfaces of geometry fixing capabilities in accordance with various embodiments.

FIG. 10A is an illustrative diagram of a client-side user interface for geometry fixing capabilities in accordance with various embodiments. User interface 1000 may be presented on a display screen of a client device. In some embodiments, a user may upload to a file describing a 3D object, such as 3D object 1002, to a server using their client device. For example, a user seeking to obtain a price quote or purchase a 3D object printed using 3D printing techniques may upload a file describing object 1002 to a server, such as server 104 of FIG. 1.

In some embodiments, the uploaded file may be analyzed to determine whether or not there are any holes or gaps in the object. For example, object 1002 may have hole 1004. In this scenario, the object would be printed with hole 1004 included. If this is not an intentional feature, then the design may produce incorrect objects at the user's expense.

FIG. 10B is another illustrative diagram of a client-side user interface for geometry fixing capabilities in accordance with various embodiments. User interface 1050 may, in some embodiments, correspond to a user interface displayed on a client device after one or more algorithms are run on the uploaded file. The one or more algorithms may be able to detect hole 1004 within object 1002 and create a fix for the hole. In some embodiments, the one or more algorithms may ask the user whether or not to apply the fix to hole 1004 prior to its application.

In some embodiments, the one or more algorithms may use the uploaded file to determine the dimensions and structure of the 3D object to be created by the file. After the dimensions and structure of the object have been determined, the algorithms may use mathematics to create a mesh around the 3D object. For example, mesh triangles 1006a-d may be formed around hole 1004. In some embodiments, the created mesh may be virtual, and may be created on the server. Mesh triangles 1006a-d may be capable of covering the region of object 1002 including hole 1004, thus removing hole 1004 with mesh triangles 1006. Persons of ordinary skill in the art will recognize that any shape may be used to heal the holes included within an image, and the use of triangles is merely exemplary.

Figure 11:
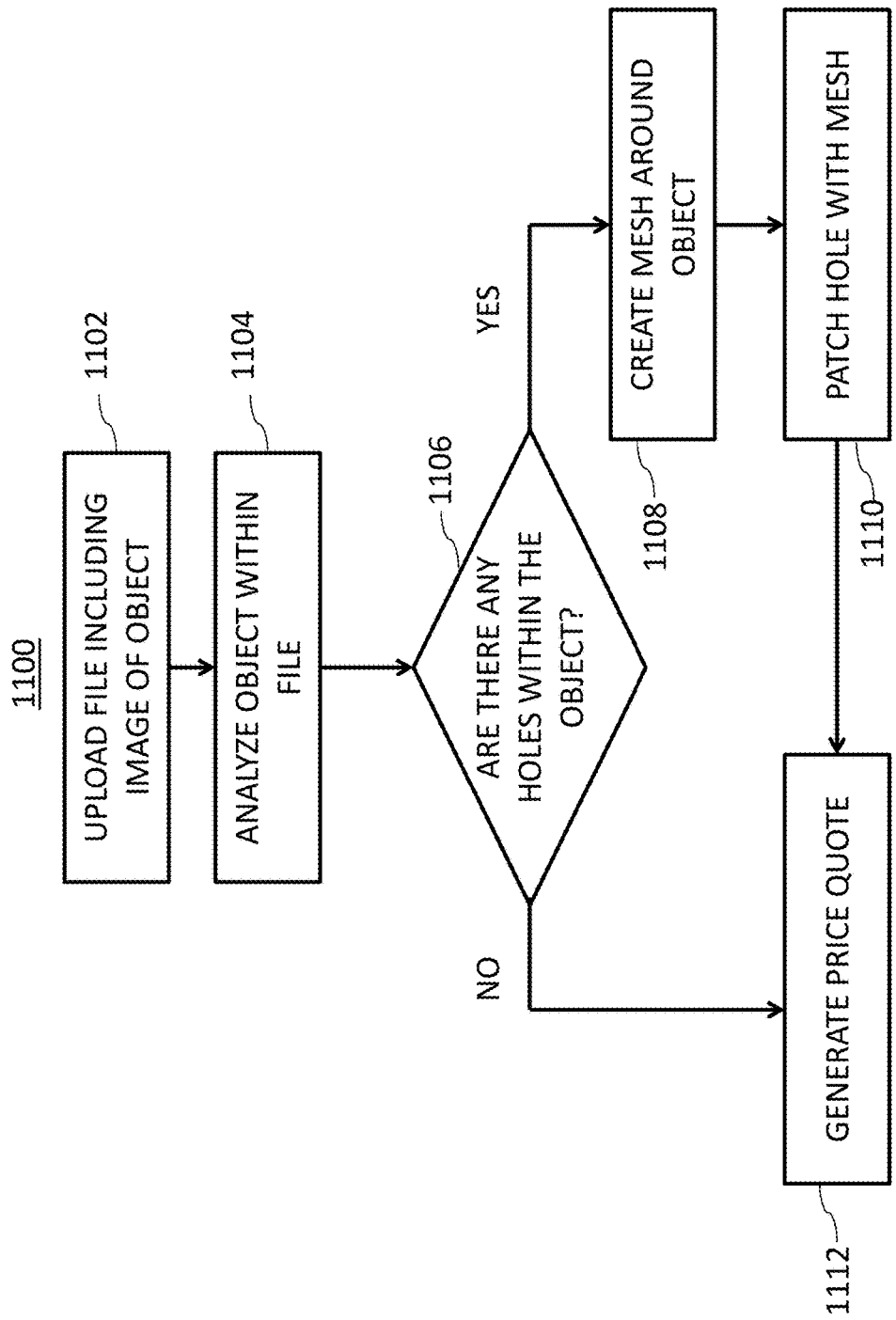
FIG. 11 is a flowchart of an illustrative process for fixing geometries of uploaded files in accordance with various embodiments.

FIG. 11 is a flowchart of an illustrative process for fixing geometries of uploaded files in accordance with various embodiments. Process 1100 may begin at step 1102. At step 1102, a file describing a 3D object may be uploaded from a client device to a server. For example, a file describing object 1002 may be uploaded to server 104 of FIG. 1.

At step 1104, the object described by the file may be analyzed. In some embodiments, the file may be analyzed by one or more algorithms resident on the server that searches for holes or gaps within the object. For example, the algorithm may form the object from the file's description or specifications, and determine whether or not there are any gaps within the object.

At step 1106, a determination may be made as to whether or not there are any holes within the object. For example, if the uploaded and analyzed file describes object 1002 therein, the one or more algorithms may determine that object 1002 includes hole 1004. In some embodiments, if a hole is determined to exist within the object, the user may be prompted to answer whether or not the hole is intentional or unintentional. For example, if the file describes a cylinder, the hole may be intentional. Therefore, the user may not wish to fix this hole. However, if the user accidentally created a file describing an object without a particular region, such as the region described by hole 1004, then the user may indicate that the hole is unintentional and therefore may need to be corrected.

If, at step 1106, there are no holes determined to be included within the object, or there are no unintentional holes, then process 1100 may proceed to step 1112. At step 1112, a price quote for the object described by the uploaded file may be generated. In some embodiments, the object may be printed after the quote is generated. For example, the user may be prompted by a user interface similar to user interface 300 of FIG. 3. In this scenario, the user may proceed with attempting to purchase the object having any number of parameters selected, as previously described with relation to FIG. 3.

If, at step 1106, there are one or more holes determined to be within the object, the process 1100 may proceed to step 1108. At step 1108, a mesh may be created around the object to cover the hole. For example, object 1002 may include hole 1004, and a mesh, such as mesh triangles 1006a-d, may be virtually formed around object 1002 to cover hole 1004. In some embodiments, one or more algorithms resident on the server may be used to determine the design or specifications of the object created by the uploaded file. These parameters may be used to form the mesh surrounding the object used to patch the hole. In some embodiments, the created mesh may cover only the hole and not the entire object. For example, object 1002 may only include mesh triangles 1006a-d covering hole 1004.

At step 1110, the holes may be patched with the mesh. For example mesh triangles 1006a-d of FIG. 10B may be used to patch hole 1004. Persons of ordinary skill in the art will recognize that any suitable method or algorithm may be used to patch a detected hole, and the aforementioned is merely exemplary. For example, instead of creating a mesh, the hole may be reconfigured to describe a positive space having similar material and textural properties of the rest of the object. After the hole has been patched or remedied, process 1100 may proceed to step 1112 (described above).

Figure 12:
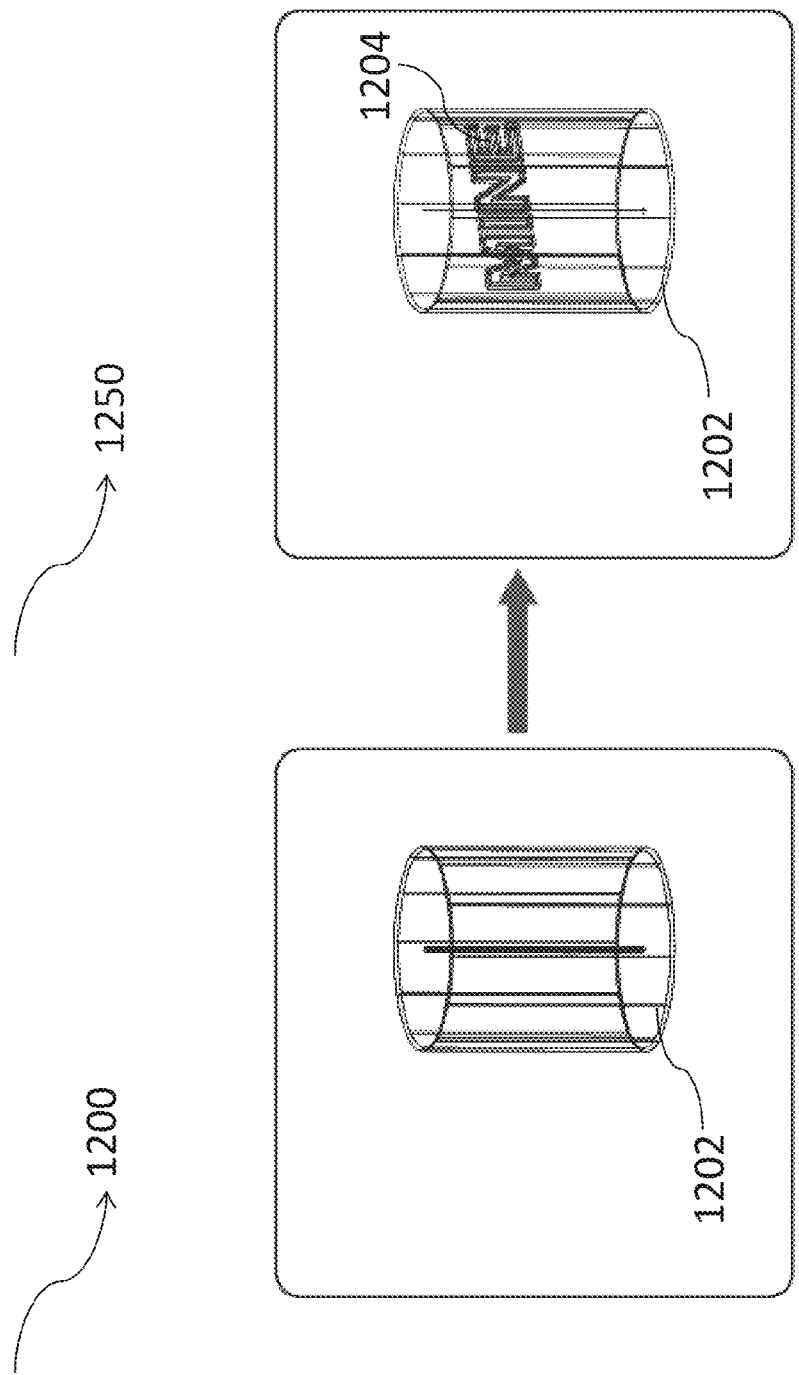
FIGS. 12A and 12B are illustrative diagrams of client-side user interfaces for geometry customization in accordance with various embodiments.

FIGS. 12A and 12B are illustrative diagrams of client-side user interfaces used for geometry customization in accordance with various embodiments. User interface 1200 may include object 1202 displayed thereon. Object 1202 may correspond to a 3D object described by a file uploaded by a user to a server. For example, the user may upload a file describing a can that they intend to have a mold made for. In some embodiments, the user may desire to add geometry customization elements to the object. For example, the user may want to imprint a word or phrase onto each can made. User interface 1250 may display object 1202 having customized element 1204 included therein. Customized element 1204 may correspond to any element or feature placed or printed onto any object to be created, including, but not limited to, the user's name, a personalized statement, a patent number corresponding to the object, a recycling logo (if the material used to form the object is a recyclable material), or any other element, or any combination thereof.

In some embodiments, each part created may include a separate serial number or part number used to help identify a complex or multi-part object. The serial number or part number may be formed as a customized element and formed on each part. For example, a mold of the serial number for the part may be created along with the mold of the part so that each mold prints the desired number onto a 3D object printed using the mold. In some embodiments, previously created objects may have their part numbers stored on the server so that objects having the same numbers (e.g., same components) may be reproduced at a later time. For example, if a user is creating a 3D car, the front wheels may include a first part number, whereas the rear wheels may include a second part number. Both the first part number and the second part number may be stored on the server so that both may be reproduced at a later time and used in conjunction with previously created parts of the same construct (e.g., car).

Figure 13:
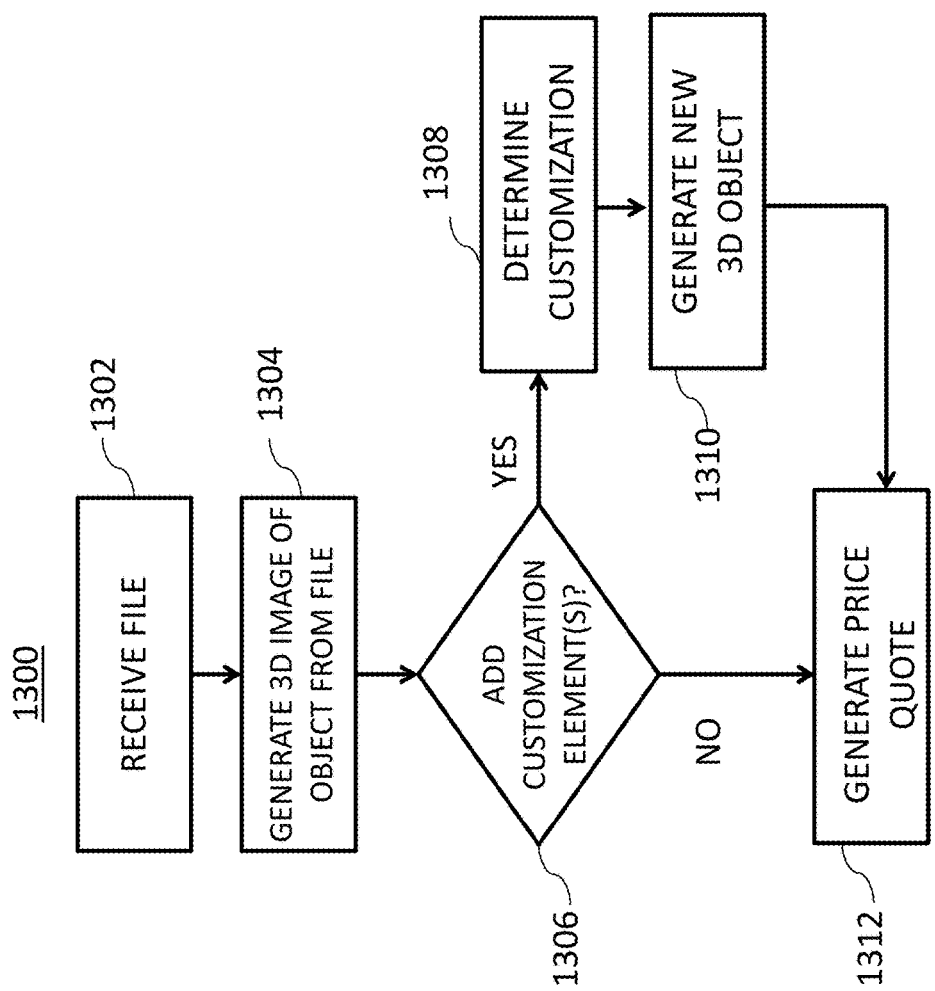
FIG. 13 is a flowchart of an illustrative process for customizing geometry in accordance with various embodiments.

FIG. 13 is a flowchart of an illustrative process for customizing geometry in accordance with various embodiments. Process 1300 may begin at step 1302. At step 1302, a file may be received at a server. In some embodiments, the file may be uploaded to a server from a client device, such as client device 102 of FIG. 1. In some embodiments, the file may include data or instructions for creating a 3D object. For example, the uploaded file may correspond to a 3D CAD file. In some embodiments, a user accessing a 3D price quoting or printing service may create the file on the server. For example, a user may be able to create the 3D object from the ground up, creating each layer and portion of the 3D object while accessing the server.

At step 1304, a 3D image of a 3D object may be generated from the file. For example, the file may include data corresponding to creating a spherical can (e.g., object 1202). In some embodiments, the object may be virtually created on the server, and a 3D image of the object may be transmitted to the client device so that the user may visualize the object.

At step 1306, a determination may be made of whether or not customization elements should be added. If, at step 1306, the user decides to add a customized element, process 1300 may proceed to step 1308. At step 1308, a determination may be made about what customization element or elements should be added to the 3D object. For example, a user may desire to include a recycling logo on the object that will be produced, and therefore may request that a recycling logo be added to the 3D object. In some embodiments, adding a customization element to the object to be produced may correspond to the server adding data to the file to create a new version of the file including the original object data as well as the customization element(s). The new data may create the customization element within the mold of the object so that each object produced by the mold includes the customization element.

At step 1310, a new file corresponding to the 3D object created having the added geometry element, may be generated and displayed on the user's client device. For example, user interface 1250 of FIG. 12B may include object 1202 as well as customization feature 1204 displayed as an image on the user interface. In some embodiments, the user may be capable of further modifying the new object by adding additional customization elements. In this particular scenario, process 1300 may return to step 1308, where additional elements may be added.

At step 1312, a price quote for creating one or more 3D objects based on the generated new 3D image including the customization element(s) may be generated. For example, after the user receives the generated new 3D file at step 1310, they may be prompted to a user interface (e.g., user interface 300 of FIG. 3) to determine materials to be used to create the object, finishes for the object, and/or quantity of objects to be made. In some embodiments, the generated new 3D image may create a new version of the originally uploaded file. The new file may be uploaded automatically to a 3D price quoting system at step 1312 to allow the user to determine the costs associated with creating their 3D object. In some embodiments, the user may also receive a price quote for creating the original object as well as creating the new object having the customized element(s). In this scenario, the user may be able to decide whether it is fiscally appropriate to purchase 3D objects, or 3D molds for creating 3D objects, that include the customized element(s). In some embodiments, if no customization element is to be added at step 1306, then process 1300 may to step 1312.

In some embodiments, after generation of the price quote, the 3D object may be purchased and/or printed directly. For example, within user interface 300, a button may be included allowing a user to directly print one or more 3D objects based on their design. This may allow the user to view what the object was to look like prior to placing a purchase order.

Figure 14:
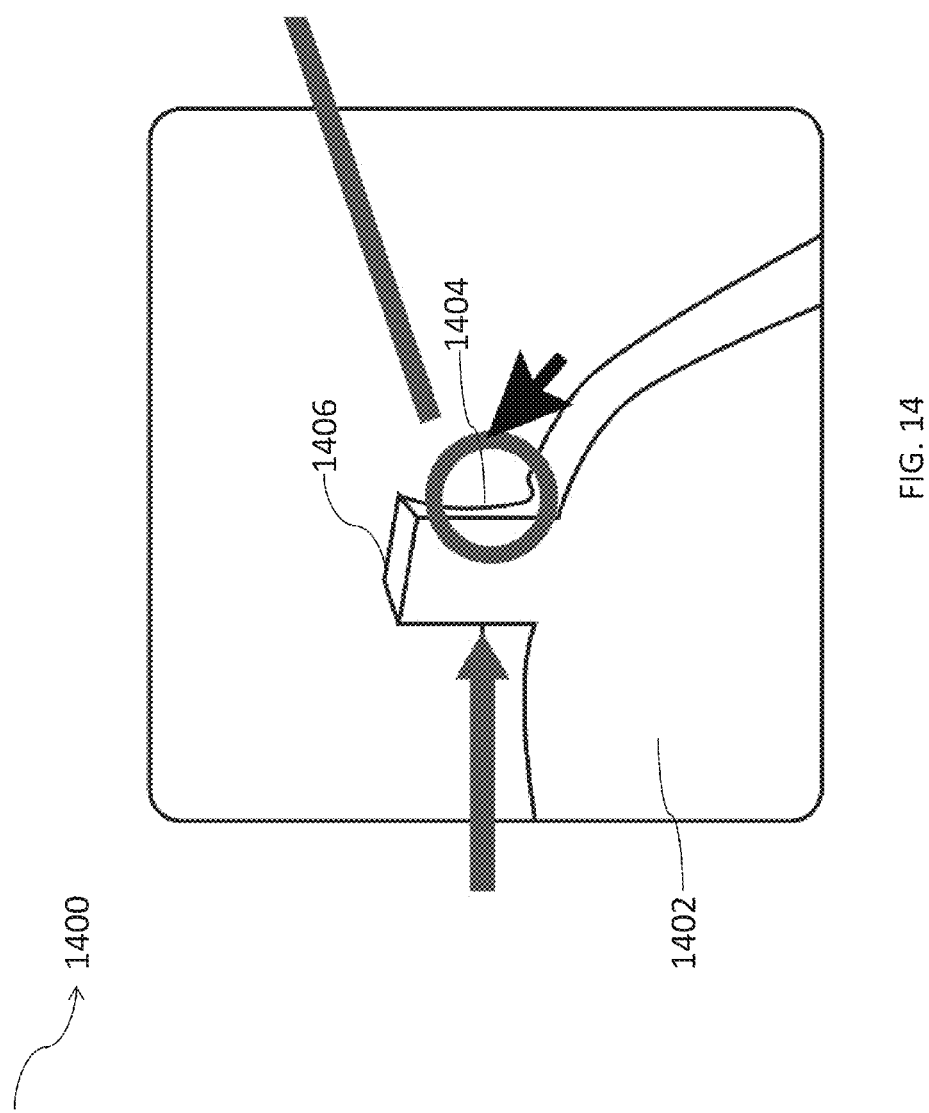
FIG. 14 is an illustrative diagram of a client-side user interface showing design optimization capabilities in accordance with various embodiments.

FIG. 14 is an illustrative diagram of a client-side user interface for design optimization capabilities in accordance with various embodiments. User interface 1400 may include object 1402 displayed on a client device's display screen. In some embodiments, one or more algorithms resident on a server (e.g., server 104 of FIG. 1), may analyze the file associated with object 1402 to look for potential areas where the design could be optimized. For example, object 1402 may be designed to include protrusion 1406. Protrusion 1406 may protrude away from object 1402 via thin beveled wall 1404. In some embodiments, analysis of this 3D object may determine that a thickness of wall 1404 may cause structural weakness in protrusion 1406, which may make it prone breakage.

In some embodiments, in response to determining potential trouble points within an object's design, one or more suggestions may be presented to the user. The suggestions may include various ways in which the design may be altered to improve stability and/or function. For example, a suggestion to improve the stability of wall 1404 may be to increase the width of wall 1404. As another example, the one or more algorithms may ask the user if they would like to implement a structural support element, such as a rod. However, in this scenario, additional support structures may increase the cost of production, and this factor may be presented to the user as well to aid in making the best possible decision.

Figure 15:
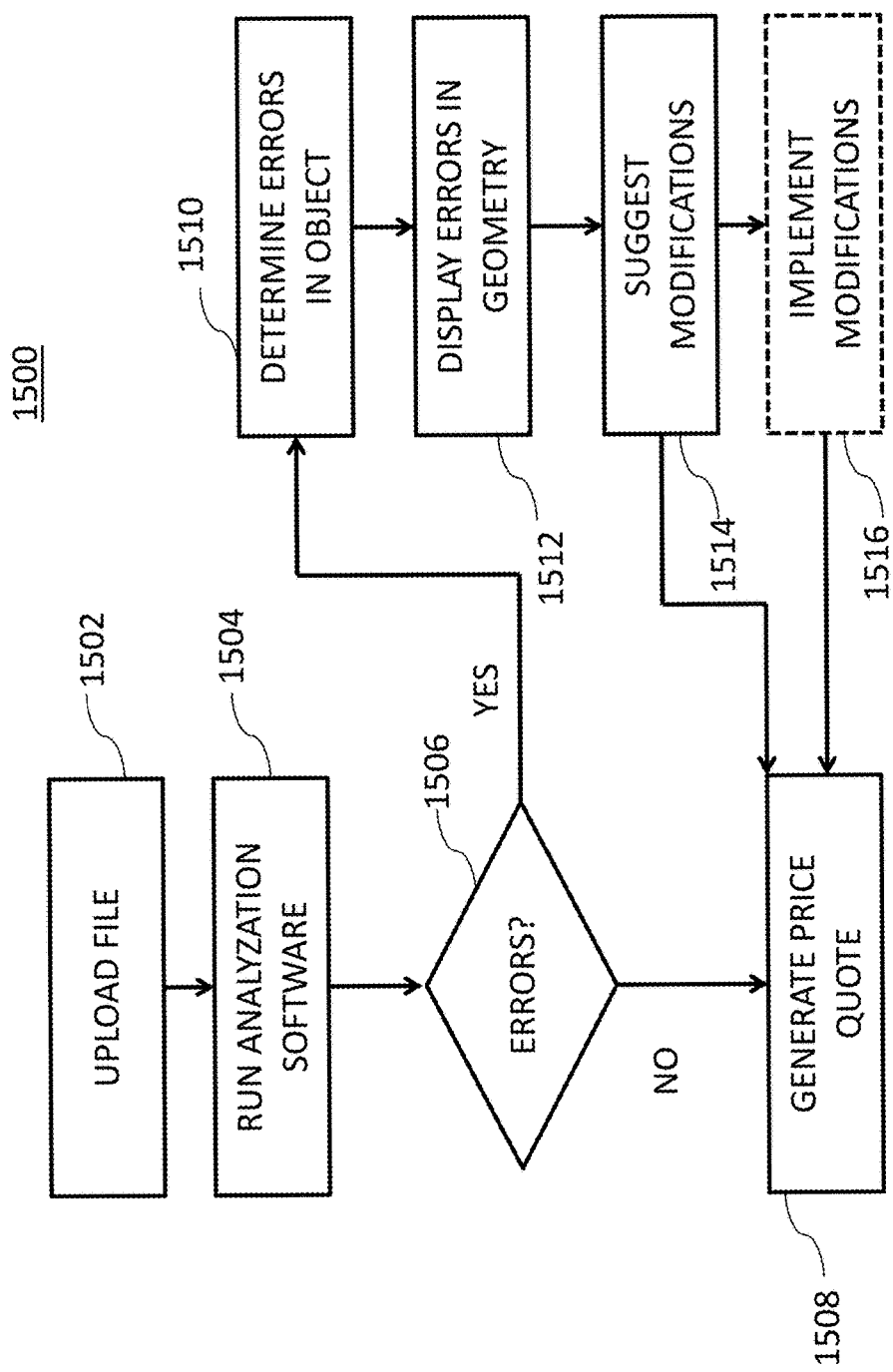
FIG. 15 is a flowchart of an illustrative process for optimizing designs in accordance with various embodiments.

FIG. 15 is a flowchart of an illustrative process for optimizing designs in accordance with various embodiments. Process 1500 may begin at step 1502. At step 1502, a file may be uploaded to a server from a client device. In some embodiments, step 1502 of FIG. 15 may be substantially similar to step 1102 of FIG. 11, and the previous description of the latter may apply to the former.

At step 1504, analyzation software or analyzation algorithms may be run on the uploaded file. The analyzation software may review data included in the file used to create a 3D object. In some embodiments, the analyzation software may look for design optimization areas associated with the 3D object to be created by the uploaded file. For example, the software may look for errors associated with the design of the object.

At step 1506, a determination may be made about whether or not any errors or potential areas for improvement/optimization may exist within the 3D object. If, at step 1506, it is determined that no errors exist, or there are not potential areas within the designed that may be optimized based on the analyzation software, then process 1500 may proceed to step 1508 where a price quote for creating the 3D object, or mold for the 3D object, may be generated. In some embodiments, step 1508 of FIG. 15 may be substantially similar to step 1312 of FIG. 13, and the previous description of the latter may apply to the former.

If, however, at step 1506, one or more errors are detected, then process 1500 may proceed to step 1510. At step 1510, the various detected areas may be determine where in the initially uploaded file the errors exist. For example, object 1402 of FIG. 14 may have an error associated with it. As a particular example, the thickness of wall 1404 may be determined to be too thin based on the wall's specifications and/or design as described within the uploaded file.

At step 1512, the determined errors may be displayed on the user's display screen. For example, wall 1404 may have an error associated with its thickness, and therefore this error may be presented to the user. As another example, it may be determined that protrusion 1404 may also be too thin, and therefore this error may also be presented to the user.

At step 1514, modifications to the design of the object may be suggested to the user. The suggested modifications may attempt to solve the determined errors of the design. For example, if wall 1404 is determined to be too thin, then a suggestion to increase the wall's thickness may be suggested. As another example, if wall 1404 is determined to be too thin, a suggestion to add a stability structure, like a support rod, may be presented. In some embodiments, the various suggestions may be presented to the user within a user interface, such as user interface 1400, which may allow the user to select one or more of the suggested modifications. In some embodiments, the user may be presented with the suggested modification and decide to not implement them. In this particular scenario, process 1500 may then proceed to step 1508 where a price quote for the 3D object may be generated. As an illustrative example, in order to fix a determined error, the only modification may be to alter the design of object 1402 to a format that the user does not like. In this scenario, the user may decide that they would rather have the design they prefer as opposed to modifying their design to implement the suggested modification(s).

Process 1500 may, in some embodiments, then proceed to optional step 1516. At step 1516, one or more of the suggested modifications may be implemented within the design of the object. For example, the user may decide to increase the thickness of wall 1404, and therefore the data within the original file indicating the wall's thickness may be changed. In some embodiments, specific changes may be suggested and implemented. For example, a suggestion to modify the thickness of wall 1404 from 2 mm to 10 mm may be presented, and upon implementation, the original file may have the data corresponding to the wall's thickness increased from 2 mm to 10 mm. After implementation of the modification(s), process 1500 may then proceed to step 1508.

Figure 16:
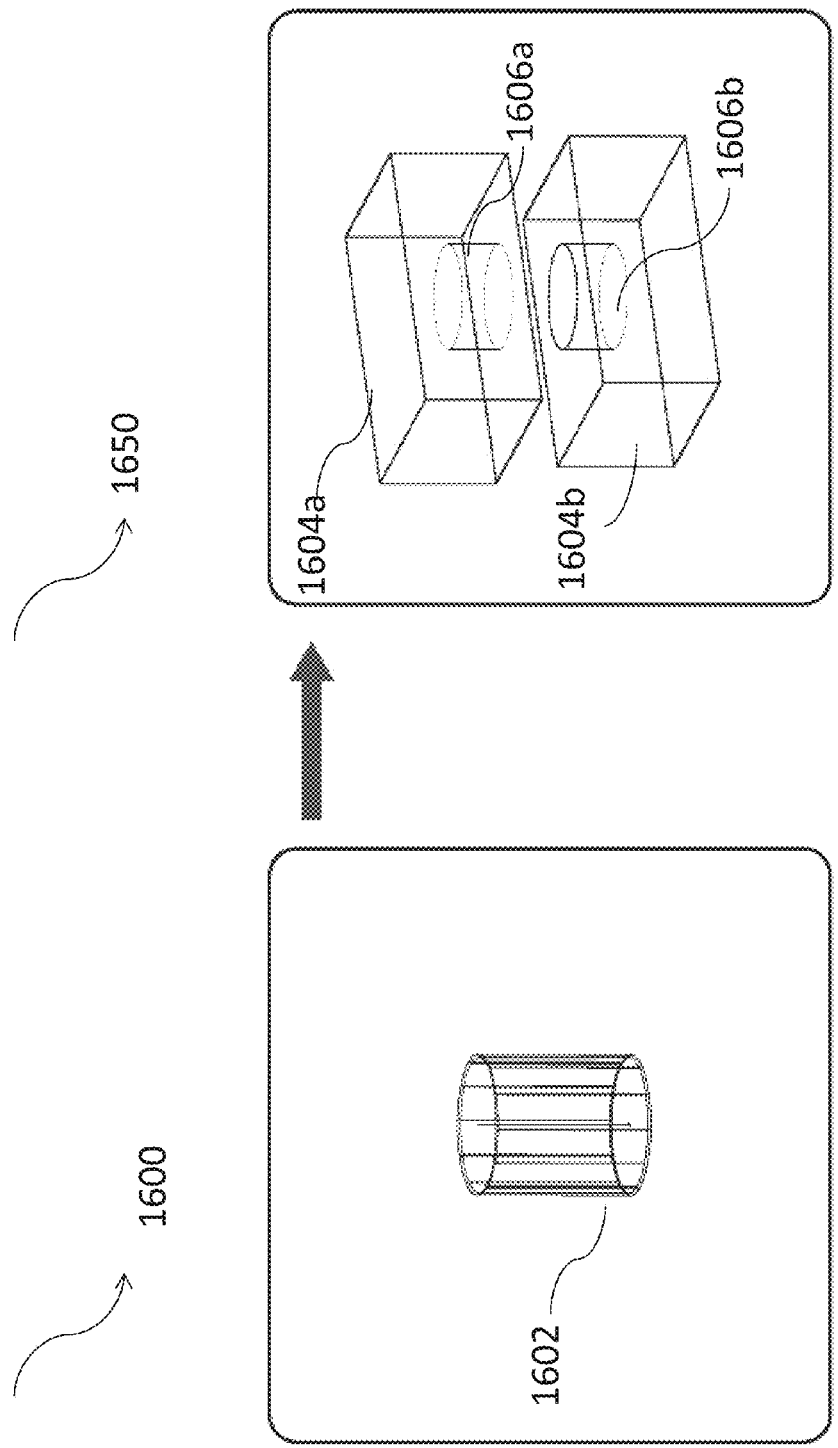
FIGS. 16A and 16B are illustrative diagrams of client-side user interfaces for using application specific tools with designs in accordance with various embodiments.

FIGS. 16A and 16B are illustrative diagrams of client-side user interfaces for using application specific tools with designs in accordance with various embodiments. User interface 1600 may display object 1602 therein. In some embodiments, object 1602 may correspond to an application specific tool. For example, a drill guide used for certain surgeries may have a specific size, or standardized dimensions. In some embodiments, 3D design files corresponding to various tools and/or objects may be stored in a library of files resident on a server (e.g., server 102 of FIG. 1). For example, the dimensions and size of a surgical drill guide may be standardized such that each one should be substantially similar. One or more files may be stored on the server such that a user may access the file to create 3D objects of the guide. In some embodiments, the user may upload a new file describing a new 3D object to be created. For example, the user may upload a file describing object 1602. In this particular scenario, the user may seek to create multiple copies of object 1602 quickly and cost efficiently.

User interface 1650 may display a means for creating molds for objects to be produced using 3D printing capabilities. In some embodiments, the file including object 1602 may be uploaded to a server, which may create a negative mold based on object 1602. For example, object 1602 may be capable of being formed using first mold 1604a and second mold 1604b (collectively mold 1604). In some embodiments, mold 1604 may include a negative space corresponding to a volume that may be used to create copies of an object, such as object 1602. For example, first mold 1604a may include first negative space 1606a, and second mold 1604b may include second negative space 1606b. When first mold 1604a and second mold 1604b are placed together, first and second negative spaces 1606a and 1606b may together form a negative space corresponding to the size and shape of object 1602. In this particular scenario, one or more 3D printing techniques may be used to create copies of object 1602 by filling or injecting material into negative spaces 1606 of mold 1604. Thus, multiple copies of standardized objects, or newly created objects, may be produced quickly and easily at a minimal expense.

Figure 17:
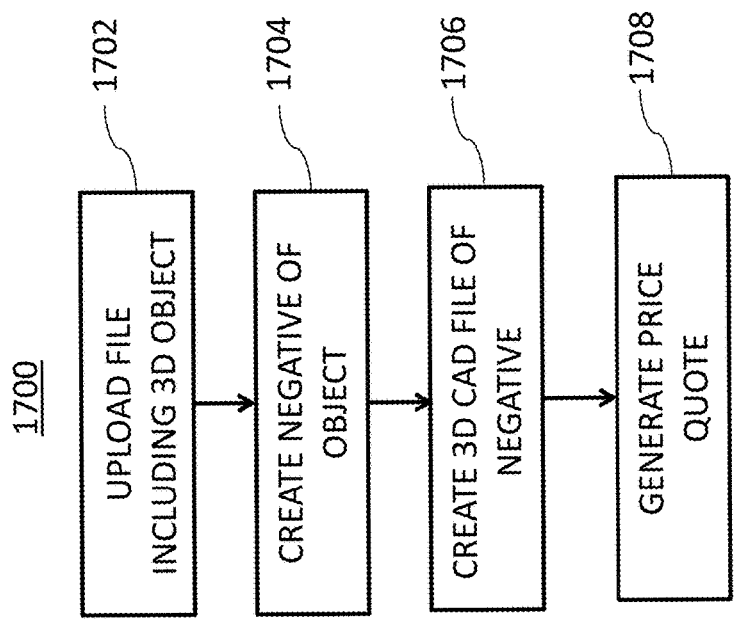
FIG. 17 is a flowchart of an illustrative process for applying application specific tools in accordance with various embodiments.

FIG. 17 is a flowchart of an illustrative process for applying application specific tools in accordance with various embodiments. Process 1700 may begin at step 1702. At step 1702, a file including a 3D object, or an image of a 3D object, may be uploaded to a server. For example, a file including data corresponding to object 1602 may be uploaded to a server. In some embodiments, the 3D object may be selected from a library of objects stored on the server. For example, standardized tools and or components for medical procedures, safety materials, or any other field, may be pre-loaded onto the server as file including data for forming 3D objects of the component.

At step 1704, a negative spacing within a mold may be created. The negative spacing may correspond to the size and specifications of the 3D object to be produced. For example, negative spacing 1606 may correspond to the size and shape of object 1602 (e.g., a cylinder). In some embodiments, the mold may include multiple portions to form the negative spacing. For example, first negative space 1606*a* may be included within first mold 1604*a*, whereas second negative spacing 1606*b* may be included within second mold 1604*b*. Combined, molds 1604*a* and 1604*b* may create a negative space corresponding to the size and shape of object 1602. Persons of ordinary skill in the art will recognize that any number of molds may be used to create the negative spacing, and the use of two is merely exemplary. For example, the negative spacing may require three molds to be joined together to accurately form the negative spacing.

At step 1706, a 3D CAD file may be created for the mold including the negative space. For example, a 3D CAD file describing the size and specifications corresponding to mold 1604 including negative space 1606 may be created. This may allow a user to create multiple copies of object 1602 using mold 1604. In some embodiments, the user may be able to customize the mold to include additional features. For example, the user may request that the mold be reinforced with a strong material, such as a metal, or that a customized element may be included within the mold to be printed on any objects created thereby.

At step 1708, a price quote may be generated for creating the 3D object, the 3D mold used to create the object, and/or both the object and the 3D mold. In some embodiments, step 1708 of FIG. 17 may be substantially similar to step 1312 of FIG. 13 and the previous description of the latter may apply to the former.

Figures 18A, 18B:
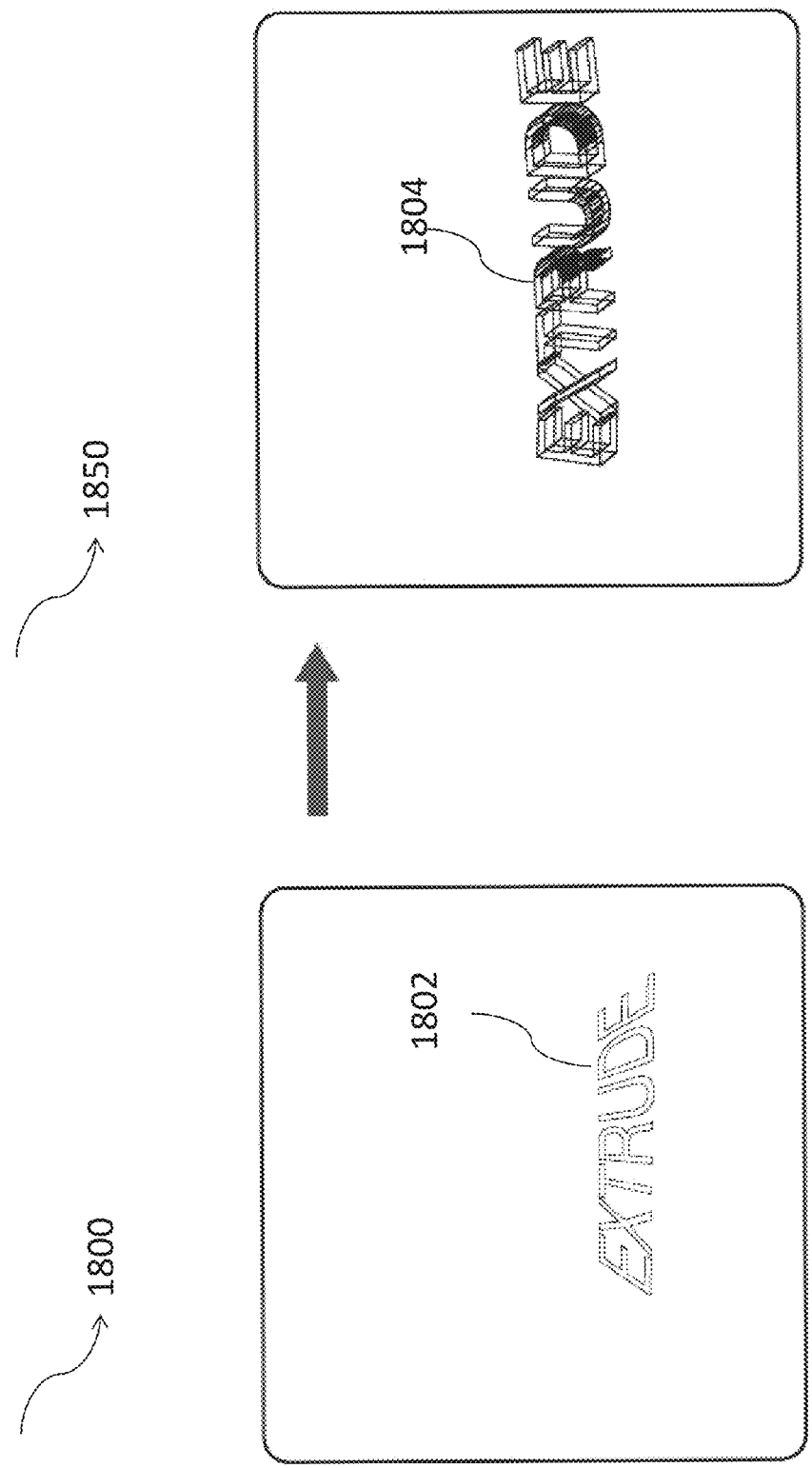
FIGS. 18A and 18B are illustrative diagrams of client-side user interfaces for converting 2D files into 3D files in accordance with various embodiments.

FIGS. 18A and 18B are illustrative diagrams of client-side user interfaces for converting a 2D file into a 3D file in accordance with various embodiments. User interface 1800 of FIG. 18A may be presented to a user on a display screen of a client device. In some embodiments, user interface 1800 may display a 2D image of a 2D object. For example, a user may upload a file including design specifications and/or data for a 2D object, such as 2D object 1802.

In some embodiments, the user may desire to convert the 2D object to a 3D object for 3D printing. For example, 3D object 1804 may be created by converting 2D object 1802 to a 3D object. In some embodiments, the conversion from 2D to 3D may occur automatically on the server. For example, the server may analyze the initially uploaded file including the 2D object, and extract a third dimension based on the design characteristics. As another example, the user may be able to input a third dimension to the 2D object so that a 3D version of the object may be created.

Figure 19:
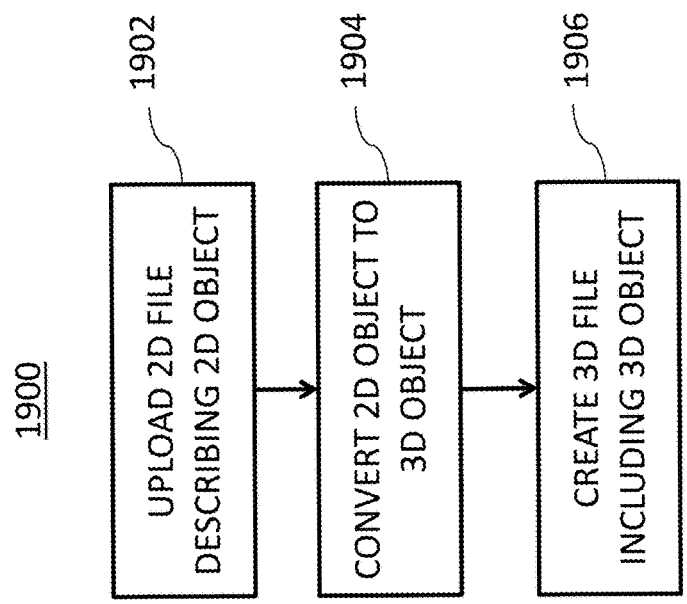
FIG. 19 is a flowchart of an illustrative process for converting 2D files into 3D files in accordance with various embodiments.

FIG. 19 is a flowchart of an illustrative process for converting a 2D file into a 3D file in accordance with various embodiments. Process 1900 may begin at step 1902. At step 1902, a user may upload a file describing a 2D object. For example, an initially uploaded file may describe a 2D object, such as object 1802 of FIG. 18A. In some embodiments, the initially uploaded file may include data corresponding to two dimensions (e.g., length and width) of an object to be formed. For example, a user may want to imprint a logo onto a 3D object to be created, and thus may initially design the logo as a 2D object within a file.

At step 1904, the 2D object may be converted to a 3D object. In some embodiments, the third dimension may be extracted or extruded from the design of the 2D object. For example, the server may analyze the file describing the 2D object or image, and may determine an appropriate size for a third dimension. As another example, the user may input a third dimension size directly to the server based on the user's preferences. In this particular scenario, the user may be provided with an interactive display option allowing the user to manually select specific values for the additional dimension. For example, a height dimension may be added to object 1802 to convert it to 3D object 1804, where the height dimension may be some fraction or ratio of the length and/or width of object 1802.

At step 1906, a new version of the initially uploaded file may be created that includes the design specifications and data corresponding to the 3D object. For example, if the initially uploaded file was a CAD file describing object 1802, having height and length data, a new file may be created including newly added width data. This may allow the user to obtain a price quote for generating one or more 3D objects (e.g., object 1804) and/or one or more molds of a 3D object based on the new file including specifications and data corresponding to a 3D object.

Figure 20:
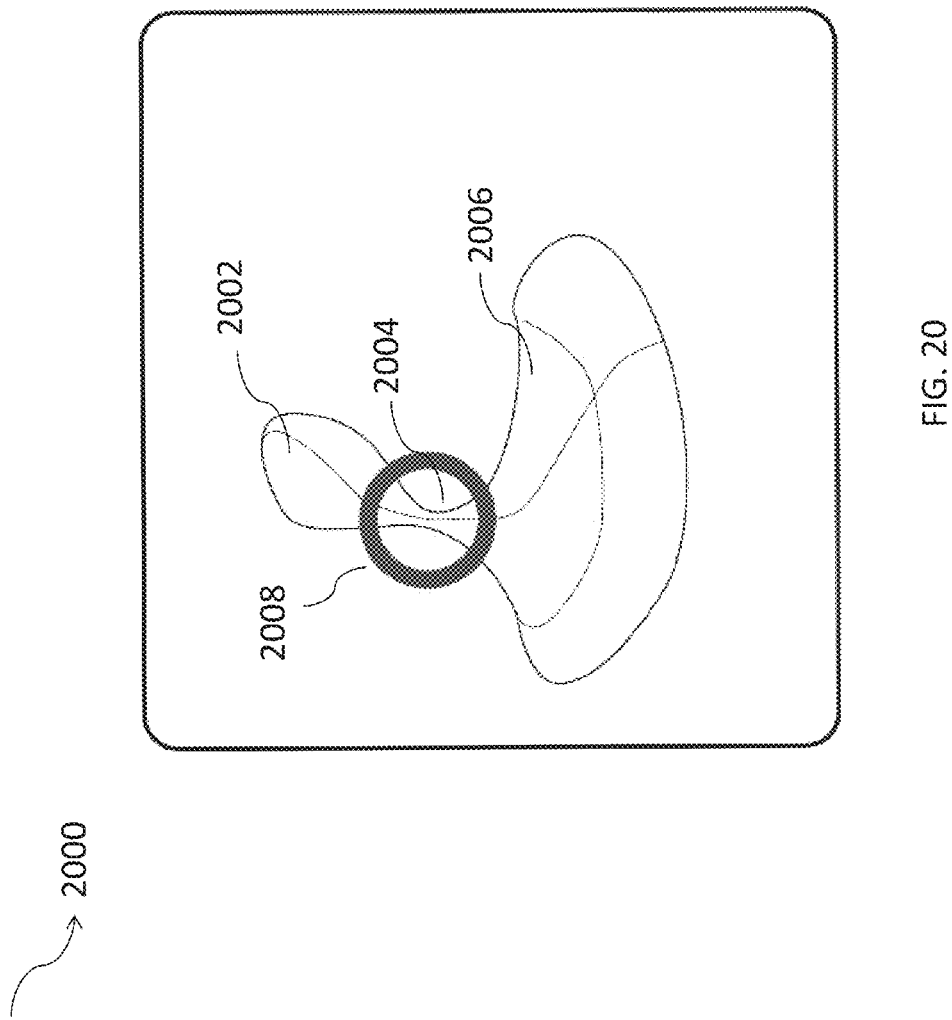
FIG. 20 is an illustrative diagram of a client-side user interface for determining optimization capabilities for a design in accordance with various embodiments.

FIG. 20 is an illustrative diagram of a client-side user interface for determining optimization capabilities for a design in accordance with various embodiments. User interface 2000 may present a 3D object to a user on their client device based on a previously uploaded and/or selected file. In some embodiments, the user may input one or more design parameters or characterizations for the object. Based on the inputted parameters and/or characterizations, the server may determine various optimization capabilities for the design. In some embodiments, the user may input a specified use for the object, and based on the use, one or more optimization modifications may be highlighted for the user. In some embodiments, the design optimization may be automated. For example, one or more algorithms resident on the server may analyze the uploaded file to determine ways to optimize the design or process for creating the 3D object. As another example, each design may be reviewed by an expert or trained individual to look for potential areas of weakness within the design or aspects of the design that may be improved.

In some embodiments, the 3D object displayed within user interface 2000 may include base portion 2006 that includes protrusion 2002 extending away from the base via extension 2004. Initially, the design process for created the object having components 2002, 2004, and 2006 may call for a first thickness. However, upon review of the process for creating a mold for the object, it may be determined that a second thickness may be more optimal for the design for providing stability. As another example, the design process may determine that extension 2004 may be more stable if an insert (e.g., a rod) is used for support. In some embodiments, highlighted region 2008 may be presented to the user to highlighted or called out any potential areas within the design or process that may be optimized. For example, highlight region 2008 may call out the fact that extension 2004 may be too thin to support protrusion 2002. In this particular scenario, one or more remedies to the highlighted issue may be suggested to the user for implementation into their design.

Figure 21:
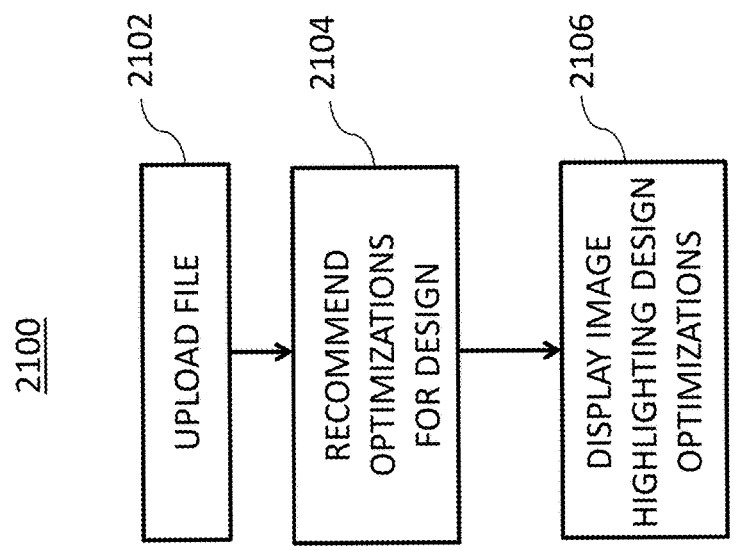
FIG. 21 is a flowchart of an illustrative process for design optimization capabilities in accordance with various embodiments.

FIG. 21 is a flowchart of an illustrative process for displaying design optimizations in accordance with various embodiments. Process 2100 may begin at step 2102. At step 2102, an initial file may be uploaded to a server from a client device. In some embodiments, step 2102 of FIG. 21 may be substantially similar to step 1102 of FIG. 11, and the previous description of the latter may apply to the former.

At step 2104, recommendations for design optimizations may be provided to the user. In some embodiments, the user may input various properties or characteristics for the design of the object to be created. Based on the inputted properties/characteristics, various recommendations may be presented to the user for their design. In some embodiments, one or more algorithms to determine potential trouble points within the design may analyze the geometry of the object.

At step 2106, the design optimizations may be displayed to the user on their client device. For example, the user may be presented with user interface 2000 including highlighted region 2008. Highlighted region 2008 may indicate a potential area where a design optimization recommendation may be beneficial. In some embodiments, any design optimizations may automatically be implemented within the design file associated with the displayed image. For example, the one or more algorithms used to detect any troublesome regions (e.g., extension 2004) may also fix the detected issues automatically. In this way, the user may be presented with a "cured" object free of any potential trouble points.

Figure 22:
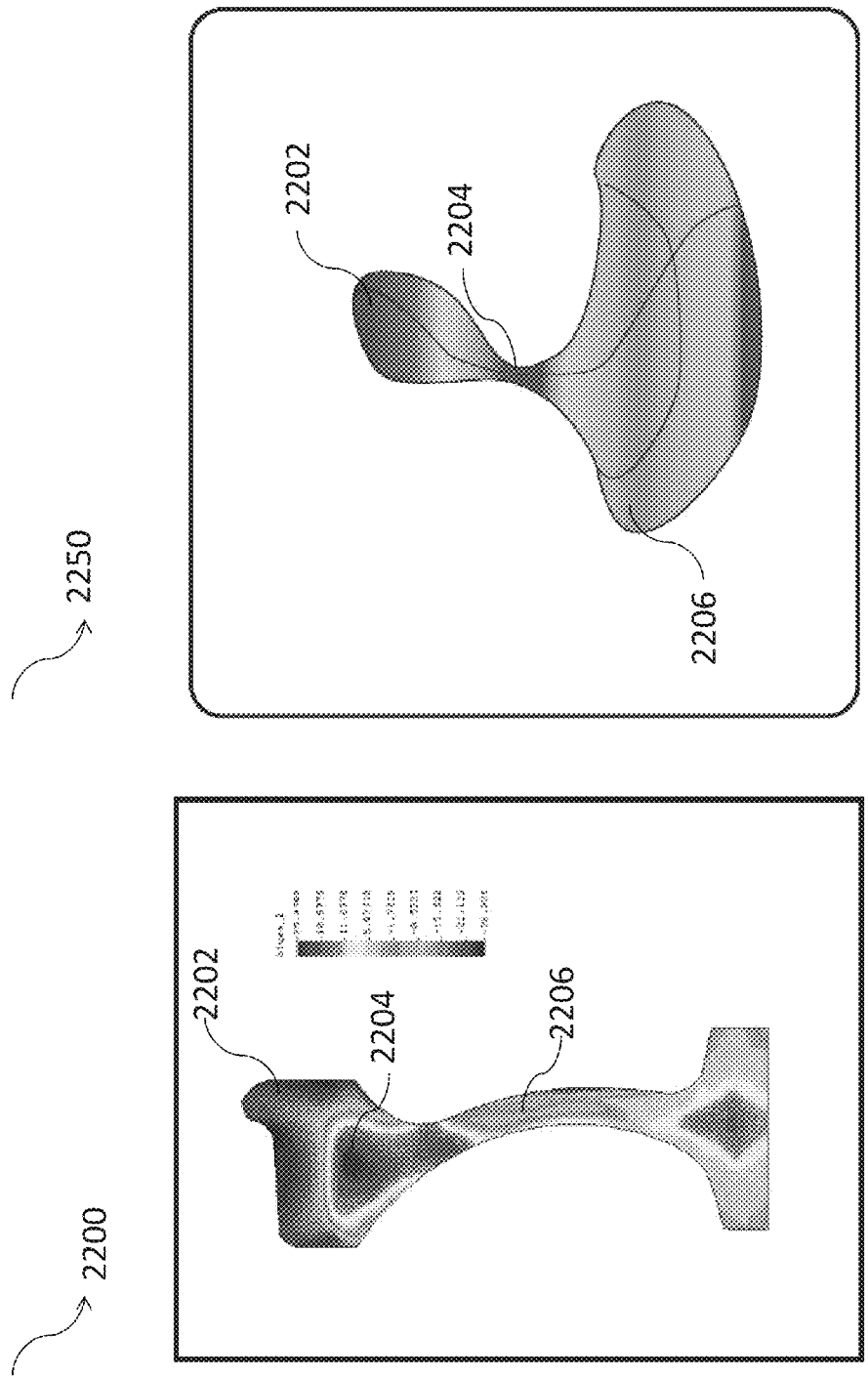
FIGS. 22A and 22B are illustrative diagrams of client-side user interfaces for applying finite element analysis to a design in accordance with various embodiments.

FIGS. 22A and 22B are illustrative diagrams of client-side user interfaces for applying finite element analysis to a design in accordance with various embodiments. User interface 2200 may presented an uploaded file that has an finite element analysis ("FEA") bitmap mapped onto it. In some embodiments, FEA techniques may be applied to an uploaded design file to determine areas of potential displacements by components of the design, strain or stress points, and/or influences on structural stability of the design based on various internal and/or external pressure loads. The FEA bitmap may be applied over the initially uploaded file at any point during the design process.

In some embodiments, user interface 2200 may present a 3D object that has had a FEA bitmap applied to it in a perspective view. For example, user interface 2200 may correspond to a side view of a 3D object showing various strain or stress points applied by finite element analysis. In some embodiments, regions that are shaded in green may be considered structurally stable when certain strains or stress are applied to the object. For example, region 2206 may correspond to a region of an object that may be structurally stable for a certain load weight or strain. In some embodiments, regions shaded in red or blue may correspond to areas that are structurally more susceptible to issues from applied strains or stresses. For example, regions 2202 and 2204 may correspond to regions of an object where, if pressure where to be applied, significant strain or stress may be caused to that region, which may compromise the stability and integrity of the object. User interface 2250 may correspond to a perspective view of the same object displayed within user interface 2200, and the previous description of the latter may also apply. Persons of ordinary skill in the art will recognize that any simulation and calculation of displacements and stresses related to a 3D object having may be performed using finite element analysis and any color scheme or display method may be used to represent the analysis. For example the effects of force, pressure, acceleration, temperature, contact, density, collisions, may be determined using finite element analysis.

Figure 23:
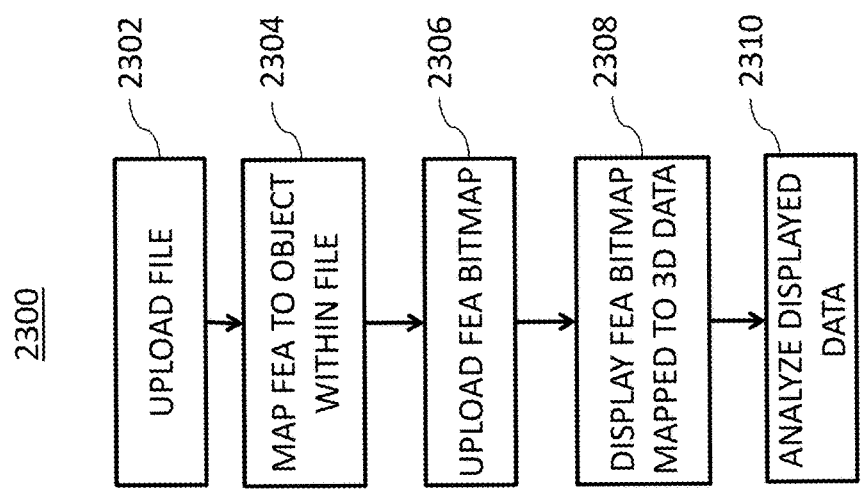
FIG. 23 is a flowchart of an illustrative process for applying finite element analysis to a design in accordance with various embodiments.

FIG. 23 is a flowchart of an illustrative flowchart for applying finite element analysis to a design in accordance with various embodiments. Process 2300 may begin at step 2302. At step 2302, a file describing a 3D object may be uploaded from a client device to a server. In some embodiments, step 2302 of FIG. 23 may be substantially similar to step 1102 of FIG. 11, and the previous description of the latter may apply. In some embodiments, the uploaded file may correspond to a specific part of a design. For example, a multi-component design may have a finite element analysis applied to one or more specific components, and those component's files may be uploaded.

At step 2304, a finite element analysis may be mapped to the object described by the uploaded file. The finite element analysis may be used to calculate the effects of force, pressure, acceleration, temperature, contact, or density, or any other effect, or any combination thereof, to the designed part. For example, finite element analysis may be performed to an object shown within user interface 2100 of FIG. 21. The FEA may be used to determine the effects of strain in the z-axis on the object due to various load forces.

At step 2306, a bitmap of the FEA may be uploaded to the server. For example, the user may upload the FEA bitmap to the server in response to the analysis completing. In some embodiments, the FEA bitmap may be uploaded to the server automatically in response to the mapping of the FEA to the object. The bitmap may be used to help visualize the results of the FEA in relation to the object's geometry.

At step 2308, the FEA bitmap may be displayed on the user interface mapped to the 3D object. For example, user interface 2200 and 2250 may present a 3D object in a side view and from a perspective view after a FEA bitmap has been mapped onto the object being analyzed. In some embodiments, this process may be performed in conjunction with step 2306 such that both may be performed automatically be the server and at a substantially same time.

At step 2310, the results of the FEA bitmap mapping may be analyzed to determine potential problem points or issues with the designed object. For example, the FEA map may point out, using color density plots, areas of the designed 3D object where structural issues may occur upon production of the object. For example, red region 2204 may correspond to an extension piece of the object that may be too thin. Thus, in response to performing the FEA on the object, it may be determined that this area may be susceptible to significant strain. In some embodiments, if a certain region (e.g., region 2204) is determined to be troublesome, one or more options may be provided to the user to remedy the potential region. For example, if region 2204 is determined to be too thin, an option may be provided to increase the thickness of this region. In some embodiments, in response to performing the FEA mapping onto the object, the user may determine that the design is satisfactory and request a price quote on the object via user interface 300 of FIG. 3.

The various embodiments described herein may be implemented using a variety of means including, but not limited to, software, hardware, and/or a combination of software and hardware. The embodiments may also be embodied as computer readable code on a computer readable medium. The computer readable medium may be any data storage device that is capable of storing data that can be read by a computer system. Various types of computer readable mediums include, but are not limited to, read-only memory, random-access memory, CD-ROMs, DVDs, magnetic tape, or optical data storage devices, or any other type of medium, or any combination thereof. The computer readable medium may be distributed over network-coupled computer systems. Furthermore, the above described embodiments are presented for the purposes of illustration are not to be construed as limitations.

What is claimed is:

1. A method for generating at least one three-dimensional (3D) object by a 3D printer, the method being performed by a server and comprising:
    receiving 3D object data associated with at least one 3D object and provided by a client device communicatively coupled with the server;
    determining, from the 3D object data, a support mold structure volume and a 3D object volume of the at least one 3D object;
    receiving parameter selection data associated with a selection by a user of at least one parameter for the at least one 3D object;
    determining pricing data based upon whether the support mold structure volume of the at least one 3D object exceeds the 3D object volume of the at least one 3D object by a threshold value associated with the parameter selection data, wherein a graphical user interface (GUI) of at least a prompt corresponding to the determination of pricing data is generated, and wherein a selection of the prompt controls a printing of the at least one 3D object on at least one 3D printer communicatively coupled to the server over a network; and
    providing GUI data corresponding to the GUI to a display device, wherein the prompt is presented to the user, such that the at least one 3D object is printed on at least one 3D printer in response to the prompt being selected.

2. The method of claim 1, wherein the 3D object data is received in an initial file.

3. The method of claim 2, wherein the initial file is a 3D CAD file.

4. The method of claim 1, wherein the GUI is generated by the server.

5. The method of claim 2, further comprising:
    converting the initial file to a 3D CAD file.

6. The method of claim 1, wherein the client device includes the display device.

7. The method of claim 2, wherein the initial file comprises at least one of: an STL file, an IGES file, a STEP file, a Catia file, a Solid Works file, a ProE file, a 3D Studio file, a Rhino file, a JPEG file, and a GIF file.

8. The method of claim 2, further comprising:
    converting the initial file to a 3D CAD file, wherein the initial file is a two-dimensional (2D) file.

9. The method of claim 1, wherein the at least one parameter comprises at least one of:
    dimensions of the at least one 3D object;
    a material to form the at least one 3D object;
    a print quantity of the at least one 3D object; and
    a finish of the at least one 3D object.

10. The method of claim 2, wherein the initial file comprises metadata of at least one of geographical or temporal data.

11. The method of claim 1, wherein the GUI includes a price quote corresponding to the third data.

12. The method of claim 11, wherein the price quote corresponds to the metadata of at least one additional object.

13. The method of claim 1, further comprising:
    determining a length of at least one axis of the at least one 3D object, wherein at least one support mold structure volume of the at least one 3D object is calculated from the length.

14. The method of claim 1, wherein the threshold value ranges from two to fifty times the support mold structure volume of at least one 3D object.

15. The method of claim 1, wherein the GUI includes a price quote determined by a first pricing scheme when the support mold structure volume of the at least one 3D object exceeds the 3D object volume of the at least one 3D object by the threshold value, and a second pricing scheme when the support mold structure volume of the at least one 3D object does not exceed the 3D object volume of the at least one 3D object by the threshold value.

16. A system for generating at least one three-dimensional (3D) object by a 3D printer, comprising:
    at least one 3D printer communicatively coupled to a server over a network; and
    the server having at least one processor and configured to:
        receive 3D object data associated with at least one 3D object and provided by a client device communicatively coupled with the server;
        determine, from the 3D object data, a support mold structure volume and a 3D object volume of the at least one 3D object;
        receive parameter selection data associated with a selection by a user of at least one parameter for the at least one 3D object;
        determine pricing data based upon whether the support mold structure volume of the at least one 3D object exceeds the 3D object volume of the at least one 3D object by a threshold value associated with the parameter selection data, wherein a graphical user interface (GUI) of at least a prompt corresponding to the determination of pricing data is generated, and wherein a selection of the prompt controls a printing of the at least one 3D object; and
        provide GUI data corresponding to the GUI to a display device, wherein the prompt is presented to the user, such that the at least one 3D object is printed on the at least one 3D printer in response to the prompt being selected.

17. The system of claim 16, wherein the 3D object data is received in an initial file.

18. The system of claim 16, wherein the GUI is generated by the server.

19. The system of claim 17, wherein the server is further configured to:
    convert the initial file to a 3D CAD file.

20. The system of claim 17, wherein the initial file comprises at least one of: an STL file, an IGES file, a STEP file, a Catia file, a Solid Works file, a ProE file, a 3D Studio file, a Rhino file, a JPEG file, and a GIF file.

21. The system of claim 17, wherein the server is further configured to:
    convert the initial file to a 3D CAD file, wherein the initial file is a two-dimensional (2D) file.

22. The system of claim 16, wherein the at least one parameter comprises at least one of:
    dimensions of the at least one 3D object;
    a material to form the at least one 3D object;
    a quantity of the at least one 3D object; and
    a finish of the at least one 3D object.

23. The system of claim 17, wherein at least one initial file comprises metadata of at least one of geographical or temporal data.

24. The system of claim 16, wherein the GUI includes a price quote corresponding to the third data.

25. The system of claim 16, wherein the server is further comprised of:
at least one memory configured to store at least the 3D object data and the parameter selection data.

26. The system of claim 16, wherein the client device is communicatively coupled to the server over the network.

27. The method of claim 11, wherein the price quote is based upon at least one of:
approximate density of the at least one 3D object;
the size of the at least one 3D object;
complexity of the at least one 3D object;
a finish selected for the least one 3D object;
print quantity of molds for the at least one 3D object; or
materials for producing the at least one 3D object.

28. The system of claim 24, wherein the price quote is based upon at least one of:
approximate density of that 3D object;
the size of that 3D object;
complexity of that 3D object;
a finish selected for that 3D object;
print quantity of molds for that 3D object; or
materials for producing that 3D object.

29. The method of claim 1, further comprising:
determining a number of triangles to fill a region of the at least one 3D object.

30. The method of claim 1, further comprising:
determining a projected area of the a support mold structure having the support mold structure volume, wherein at least one support mold structure volume of the at least one 3D object is calculated using the projected area.

31. The method of claim 1, further comprising:
providing a polling region to allow the user to elicit feedback from at least one other user regarding one or more options for printing the at least one 3D object.

32. The method of claim 1, further comprising:
generating a negative spacing in at least one support mold for at least one 3D object, the negative spacing being based upon at least one of size and shape of the at least one 3D object.

33. The method of claim 2, further comprising:
determining with a finite element analysis (FEA) bitmap mapped to the initial file:
areas of potential displacement by components of a design in the initial file;
at least one of strain or stress points of the design; or
at least one influence on structural stability of the design based on at least one of internal or external pressure loads.

34. The method of claim 11, wherein the GUI further includes an estimated time for at least one of generating the price quote or the printing of the at least one 3D object corresponding to the pricing data.

* * * * *